US008897449B1

(12) United States Patent
Broadbent

(10) Patent No.: US 8,897,449 B1
(45) Date of Patent: Nov. 25, 2014

(54) QUANTUM COMPUTING ON ENCRYPTED DATA

(75) Inventor: Anne Broadbent, Listowel (CA)

(73) Assignee: Quantum Valley Investment Fund LP, Waterloo, Ontario (CA)

( * ) Notice: Subject to any disclaimer, the term of this patent is extended or adjusted under 35 U.S.C. 154(b) by 14 days.

(21) Appl. No.: 13/610,096

(22) Filed: Sep. 11, 2012

Related U.S. Application Data

(60) Provisional application No. 61/533,535, filed on Sep. 12, 2011, provisional application No. 61/664,953, filed on Jun. 27, 2012.

(51) Int. Cl.
*G06F 21/00* (2013.01)
*H04L 29/06* (2006.01)
*H04L 9/12* (2006.01)
*H04L 9/08* (2006.01)

(52) U.S. Cl.
USPC ............... 380/277; 380/30; 380/44; 380/278; 380/279

(58) Field of Classification Search
USPC ............... 380/277, 278, 279, 30, 44
See application file for complete search history.

(56) References Cited

U.S. PATENT DOCUMENTS

| | | | | |
|---|---|---|---|---|
| 2006/0249670 | A1* | 11/2006 | Monroe et al. | 250/283 |
| 2008/0267635 | A1* | 10/2008 | Kawamoto et al. | 398/141 |
| 2009/0013175 | A1* | 1/2009 | Elliott | 713/154 |
| 2010/0251049 | A1* | 9/2010 | Goto et al. | 714/746 |

FOREIGN PATENT DOCUMENTS

JP 2007189517 A * 7/2007

OTHER PUBLICATIONS

Zhengjun Cao; Lihua Liu; "Improvement of one quantum encryption scheme"; Intelligent Computing and Intelligent Systems (ICIS), 2010 IEEE International Conference on Volume: 1; Digital Object Identifier: 10.1109/ICICISYS.2010.5658669; Publication Year: Sep. 2010; pp. 335-339.*

D. Aharonov, M. Ben-Or, E. Eban. Interactive proofs for quantum computations. Obtained from the Internet at http://lanl.arxiv.org/abs/0810.5375v2, dated Nov. 2008, 25 pages.

A. Ambainis, M. Mosca, A. Tapp, and R. De Wolf. Private quantum channels. In Proceedings of the 41st Annual Symposium on Foundations of Computer Science (FOCS 2000), 7 pages.

C.H. Bennett, F. Bessette, G. Brassard, L. Salvail, and J. Smolin. Experimental Quantum Cryptography. Sep. 1991. 28 pages.

C. H. Bennett and G. Brassard. Quantum cryptography: Public key distribution and coin tossing. In Proceedings of the IEEE International Conference on Computers, Systems, and Signal Processing, pp. 175-179, 1984.

(Continued)

*Primary Examiner* — Andrew Nalven
*Assistant Examiner* — Courtney Fields
(74) *Attorney, Agent, or Firm* — Fish & Richardson P.C.

(57) ABSTRACT

Quantum computing methods and systems are described. A computing device receives an encrypted state from another device. The encrypted state is stored on a quantum register, and a sequence of operations is applied to the encrypted state in the quantum register. The sequence of operations includes an operation parameterized by a control message from the other device. Applying the sequence of operations manipulates the state of the quantum register and an auxiliary quantum system. The auxiliary quantum system can be, for example, a qubit selected from four specified quantum states. Applying the sequence of operations produces encryption-key-update information. The computing device may send an encrypted output state and the encryption-key-update message to the other device.

33 Claims, 11 Drawing Sheets

(56) References Cited

OTHER PUBLICATIONS

C.H. Bennett, G. Brassard, C. Crepeau, R. Jozsa, A. Peres, and Wootters. Teleporting an unknown quantum state via dual classical and Eistenin-Podol. Mar. 1993, 5 pages.

H. Barnum, C. Crepeau, D. Gottesman, A. Smith, and A. Tapp. Authentication of quantum messages. In Proceedings of the 43rd Annual IEEE Symposium on the Foundations of Computer Science (FOCS '02), 10 pages, 2002.

A. Broadbent, J. Fitzsimons, and E. Kashefi. Universal blind quantum computation. In Proceedings of the 50th Annual Symposium on Foundations of Computer Science (FOCS 2009), pp. 517-526, 2009.

S. Barz, E. Kashefi, A. Broadbent, J. F. Fitzsimons, A. Zeilinger, and P. Walther. Demonstration of blind ind quantum computing. Science, 20:303-308, Jan. 2012.

A. Childs. Secure assisted quantum computation. Quantum Information and Computation, 5:456-466, 2005. Obtained from the Internet at http://arxiv.org/abs/quant-ph/0111046v2, dated Jul. 2005, 11 pages.

A. M. Childs, D. W. Leung, and M. A. Nielsen. Unified derivations of measurement- based schemes for quantum computation. Physical Review A, 71:032318, 2005, 14 pages.

I. B. Damgard, S. Fehr, L. Salvail, and C. Schaner. Cryptography in the bounded- quantum-storage model. In Proceedings of the 46th IEEE Symposium on Foundations of Computer Science (FOCS 2005), 2005. 10 pages.

F. Dupuis, J. B. Nielsen, and L. Salvail. Secure two-party quantum evaluation of unitaries against specious adversaries. In CRYPTO'10, pp. 685-706, 2010.

O. Goldreich, S. Micali, and A. Wigderson. How to play any mental game. In Proceedings of the nineteenth annual ACM symposium on Theory of computing, STOC '87, pp. 218-229, 1987.

E. Farhi, D. Gosset, A. Hassidim, A. Lutomirski, and P. Shor. Quantum money from knots. Obtained from the Internet at http://arxiv.org/abs/1004.5127v1, dated Apr. 2010, 22 pages.

E. Farhi, D. Gosset, A. Hassidim, A. Lutomirski, and P. Shor. Quantum money from knots. ITCS 2012, Cambridge MA, 14 pages.

D. Gottesman and I. L. Chuang. Demonstrating the viability of universal quantum computation using teleportation and single-qubit operations. Nature, 402:390-393, 1999.

C. Gentry. Fully homomorphic encryption using ideal lattices. In Proceedings of the 41st annual ACM symposium on Theory of computing (STOC '09), pp. 169-178, 2009.

D. Gottesman. The Heisenberg representation of quantum computers. In Group 22: Proceedings of the XXII International Colloquium on Group Theoretical Methods in Physics, 1998. Obtained from the Internet at http://arxiv.org/abs/quant-ph/9807006v1, dated Jul. 1998, 20 pages.

P. Kok, W. J. Munro, K. Nemoto, T. C. Ralph, J.P. Dowling, and G. J. Milburn. Linear optical quantum computing with photonic qubits. Review of Modern Physics, 79:135-174, 2007.

M. Mosca and D. Stebila. Quantum coins. Error-Correcting Codes, Finite Geometries and Cryptography, 523:35-47, 2010. Obtained from the Internet at http://arxiv.org/abs/0911.1295v1, dated Nov. 2009, 12 pages.

S. Popescu and D. Rohrlich. Quantum nonlocality as an axiom. Foundations of Physics, vol. 24, No. 3, 1994, 7 pages.

R. Rivest, L. Adleman, and M. Dertouzos. On data banks and privacy homomorphisms. In Foundations of Secure Computation, 1978, 11 pages.

R. Rivest, A. Shamir, and L. Adleman. A method for obtaining digital signatures and public-key cryptosystems. Communications of the ACM 21, 1978, 15 pages.

P. W. Shor. Polynomial-time algorithms for prime factorization and discrete logarithms on a quantum computer. SIAM Journal on Scientific and Statistical Computing, 26(5):1484-1509, 1997.

P. W. Shor and J. Preskill. Simple proof of security of the BB84 quantum key distribution protocol. Physical Review Letters, 85:441-444, 2000.

L. Salvail, C Schaffner, and M. Sotakova. On the power of two-party quantum cryptography. In proceedings of the $15^{th}$ International Conference on Theory and Application of Cryptology and Information Security: Advances in Cryptology, ASIACRYPT '09, pp. 70-87, 2009.

J. Watrous. Zero-knowledge against quantum attacks. SIAM Journal on Computing, 39:25-58, 2009.

A. Yao. How to generate and exchange secrets. In Proceedings of the 27th Annual Symposium on Foundations of Computer Science, pp. 162-167, 1986.

X. Zhou, D.W. Leung, and I. L. Chuang. Methodology for quantum logic gate construction. Phys. Rev. A, 62(5):052316, 2000, 12 pages.

Dunjko et al.; Blind Quantum Computing with Weak Coherent Pulses; Physical Review Letters; PRL 108, 200502 (2012); American Physical Society; May 18, 2012; 5 pages.

Fisher et al.; Quantum Computing on Encrypted Data; Nature Communications DOI: 10.1038/ncomms4074; published Jan. 21, 2014; 7 pages.

Fitzsimons et al.; Unconditionally Verifiable Blind Computation; Singapore University of Technology and Design; Aug. 16, 2013; 42 pages.

Giovannetti et al.; Efficient Universal Blind Quantum Computation; Physical Review Letters; PRL 111, 230501 (2013); American Physical Society; Dec. 6, 2013; 5 pages.

Mantri et al.; Optimal Blind Quantum Computation; Physical Review Letters; PRL 111, 230502 (2013); American Physical Society; Dec. 6, 2013; 5 pages.

Morimae; Continuous-Variable Blind Quantum Computation; Physical Review Letters; PRL 109, 230502 (2012); American Physical Society; Dec. 7, 2012; 5 pages.

Morimae et al.; Secure Entanglement Distillation for Double-Server Blind Quantum Computation; Physical Review Letters; PRL 111, 020502 (2013) American Physical Society; Jul. 12, 2013; 5 pages.

Nielson et al.; Quantum Computation and Quantum Information—Sections 1.3, 4.1, 4.2, 4.3, 4.4, 4.5, 12.6, and Appendix 5; Cambridge University Press; 2000; 70 pages.

Sueki et al.; Ancilla-Driven Universal Blind Quantum Computation; Physical Review A 87, 060301(R) (2013) American Physical Society; 5 pages.

\* cited by examiner

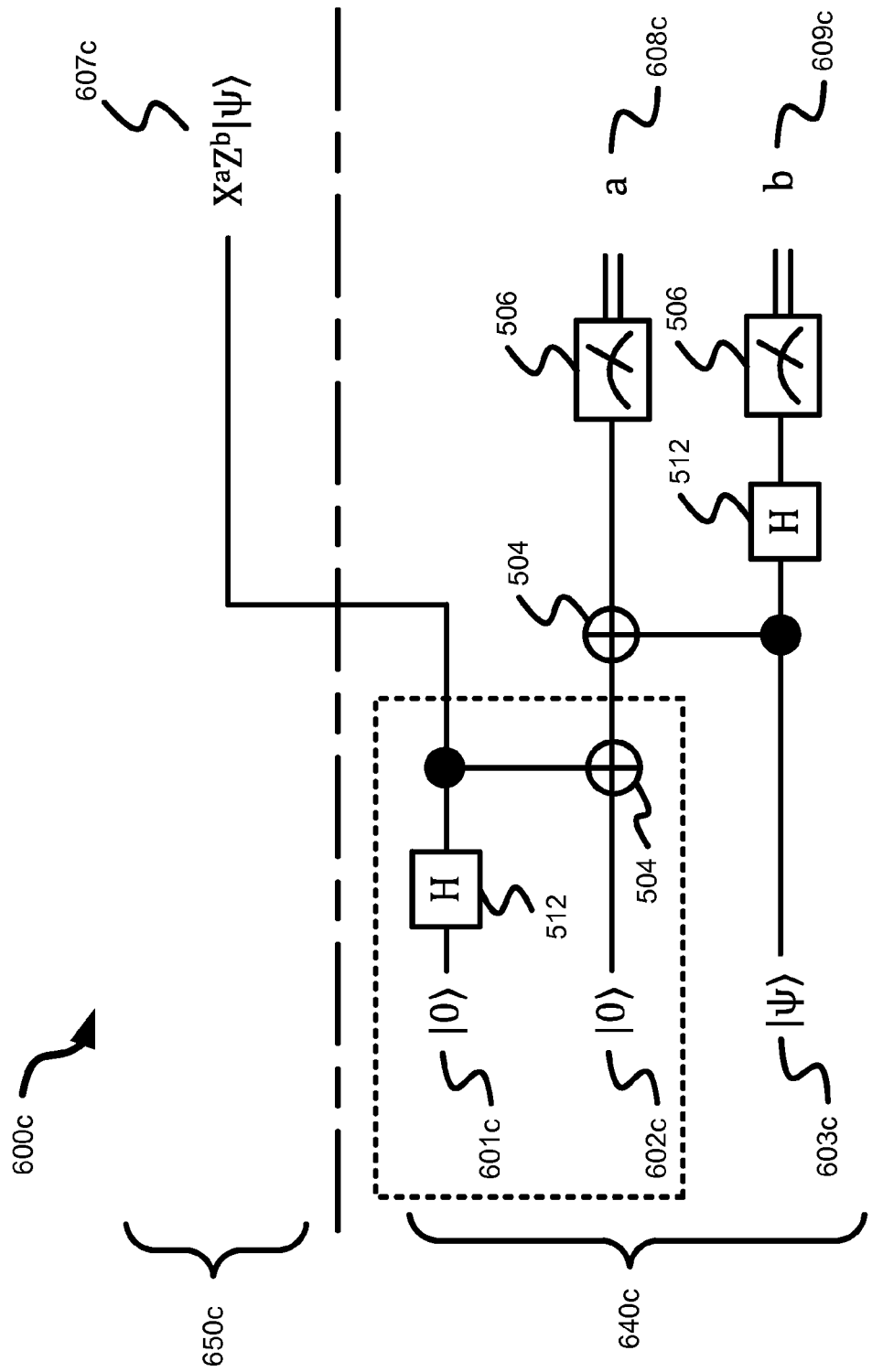

QUANTUM COMPUTING ON ENCRYPTED DATA

CROSS-REFERENCE TO RELATED APPLICATIONS

This application claims the benefit of U.S. Provision Application No. 61/533,535, filed Sep. 12, 2011, entitled "Quantum Computing on Encrypted Data," and the benefit of U.S. Provisional Application No. 61/664,953, filed Jun. 27, 2012, entitled "Quantum Computing on Encrypted Data;" the entire contents of both priority applications are hereby incorporated by reference.

BACKGROUND

This specification relates to quantum computing systems. A variety of quantum computing systems and techniques have been proposed. A quantum computing system may include a quantum information processor, a communication interface, data storage, and other features. A quantum processor typically encodes information in the state of a quantum system and utilizes the dynamics of the quantum system to process the encoded information. In some contexts, such devices can execute computing tasks by controlling, manipulating, or otherwise utilizing the quantum dynamics of the system. In addition, quantum computing systems may encrypt quantum information and store or communicate the encrypted quantum information. In some examples, encrypted quantum information can be communicated between separate quantum computing systems (e.g., between clients and servers).

SUMMARY

In a general aspect, a quantum computer operates on a quantum state that has been encrypted by an encryption key. In some cases, the quantum computer produces an encrypted output state and information that can be used to update the encryption key.

In some aspects, a computing device receives an encrypted state from another device. The encrypted state is stored on a quantum register, and a sequence of operations is applied to the encrypted quantum register. The sequence of operations includes an operation parameterized by a control message from the other device. Applying the sequence of operations manipulates the state of the quantum register and an auxiliary quantum system. The auxiliary quantum system can be, for example, a qubit selected from four specified quantum states. Applying the sequence of operations produces encryption-key-update information. The computing device may send an encrypted output state and an encryption-key-update message to the other device.

The details of one or more implementations are set forth in the accompanying drawings and the description below. Other features, objects, and advantages will be apparent from the description and drawings, and from the claims.

BRIEF DESCRIPTION OF DRAWINGS

FIGS. 6A-6E are schematic diagrams showing more example quantum circuits.

DETAILED DESCRIPTION

Figure 1:
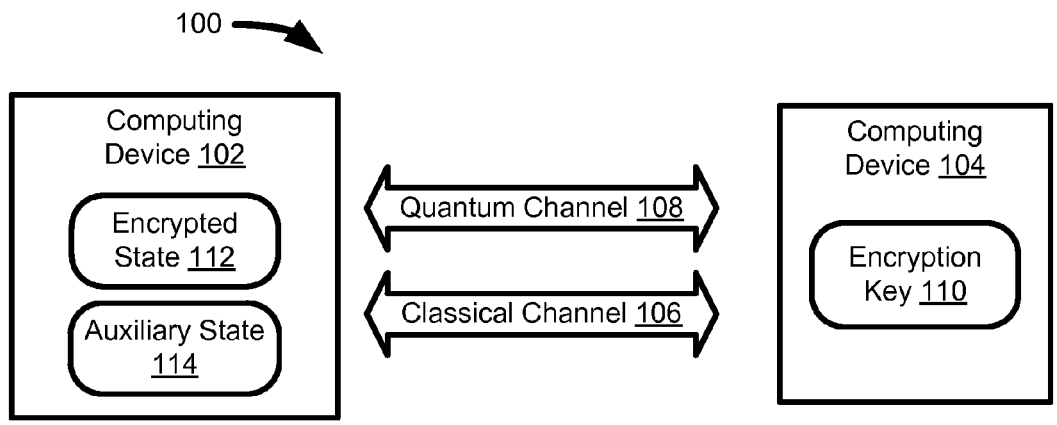
FIG. 1 is a schematic diagram showing aspects of an example computing system.

The present disclosure describes systems and methods that can be used, for example, to delegate quantum computation on encrypted data. The techniques described here can be implemented in any suitable computing environment, such as, for example, a client-server environment, a peer-to-peer environment, or another suitable computing environment. In some examples, a client holds an encryption key for an encrypted quantum register held by a server, and the server can perform quantum computing on the encrypted register.

In some implementations, the server is configured to perform a universal set of quantum gates on encrypted quantum data provided by the client. The server's universal set of quantum gates can be represented, in some instances, by a full set of Clifford group gates and a single non-Clifford group gate. In some implementations, all of the Clifford group gates are non-interactive (e.g., performed by the server without client interaction), while the remaining non-Clifford group gate is interactive (e.g., based on interactions between the server and the client). In some of the example non-Clifford group gates described here, the client prepares and sends a single random auxiliary qubit (chosen among four possibilities), and the client and server exchange classical communication. Reduction to an entanglement-based protocol can be used to show privacy against any adversarial server according to a simulation-based security definition.

In some contexts, fully homomorphic encryption allows data to be encrypted by one party and processed by another. The requirements of fully homomorphic encryption can be relaxed, for example, by allowing other interactions between the client and server. At the same time, the requirements can be strengthened, for example, by asking for information-theoretic security. This can produce an asymmetric scenario—a quantum server or quantum cloud architecture, which is a particularly relevant scenario in many computing environments.

In some implementations, a client (e.g., a partially-classical client) can delegate the execution of any quantum computation to a remote quantum server, and this computation can be performed on quantum data that is encrypted via a quantum one-time pad. Privacy can be maintained, for example, where the server is not provided access to the encryption key or under other conditions. In such a delegation of computation on encrypted data, the operations performed by the client can be significantly easier to perform than the computation itself. For example, in some cases, the client has only limited quantum resources, rather than universal quantum computation capabilities. In some cases, the client has the ability to perform encryption and decryption, e.g., by applying single-qubit Pauli operators; the client can also have the ability to prepare and send random qubits chosen from a set of four possibilities. The set of four possible states can be unitarily equivalent to the set $\{|0\rangle, |+\rangle, |-\rangle\}$, which are known as the BB84 states, for the role that they play in the quantum key distribution protocol known by the same name. In some cases, the client does not use quantum memory. For example, auxiliary quantum states can be prepared using photon polarization or other suitable techniques. In such cases, for an honest client, security can be proven against any cheating server via simulations.

The protocols described here may provide advantages in some instances. For some protocols, a conceptually simple proof of correctness is available, together with a security definition and proof that is applicable to all types of information, including shared entangled quantum registers. Additionally, some protocols may be more efficient in terms of quantum or classical communication, and could lead to the experimental delegation of a wider class of private quantum computations.

The protocols described here can be used in a variety of applications. For example, a delegated, private execution of Shor's algorithm can be used to factor in polynomial time on a quantum computer (factoring in polynomial time is widely believed to be intractable on a classical computer). Where the computation is performed on an encrypted input, the server will not know which integer he is factoring; if this integer corresponds to an RSA public key then the server will not know which public key he is helping to break. Thus, quantum computing on encrypted data may be useful, for example, for the delegation of problems that can be solved in quantum polynomial time, with the underlying assumption that they cannot be solved in classical polynomial time. The protocols described here can also be useful in other suitable applications and scenarios.

Applications of delegating private quantum computations are available even for quantum computers that are no more powerful than classical ones. In some implementations, the techniques described here can enable a client (e.g., a client with limited or no quantum computing resources) to perform quantum circuits on quantum data (e.g., quantum money, quantum coins, etc.) by delegating the quantum computation to another device (e.g., a server with universal quantum computing capabilities).

Some aspects of the present disclosure consider the scenario of quantum computing on encrypted data. In such scenarios, one party holds an encrypted quantum register while the other party holds the encryption key. In some implementations, performing a Clifford group circuit (or, more generally, a stabilizer circuit) on quantum data encrypted with the one-time pad can be achieved non-interactively: the server (holding the encrypted data) applies the target gates, while the client (holding secret encryption keys) adjusts her knowledge of the encryption key. To achieve universal quantum computation capabilities, the server may be configured to perform one or more non-Clifford group gates on the encrypted data.

Figure 6A:
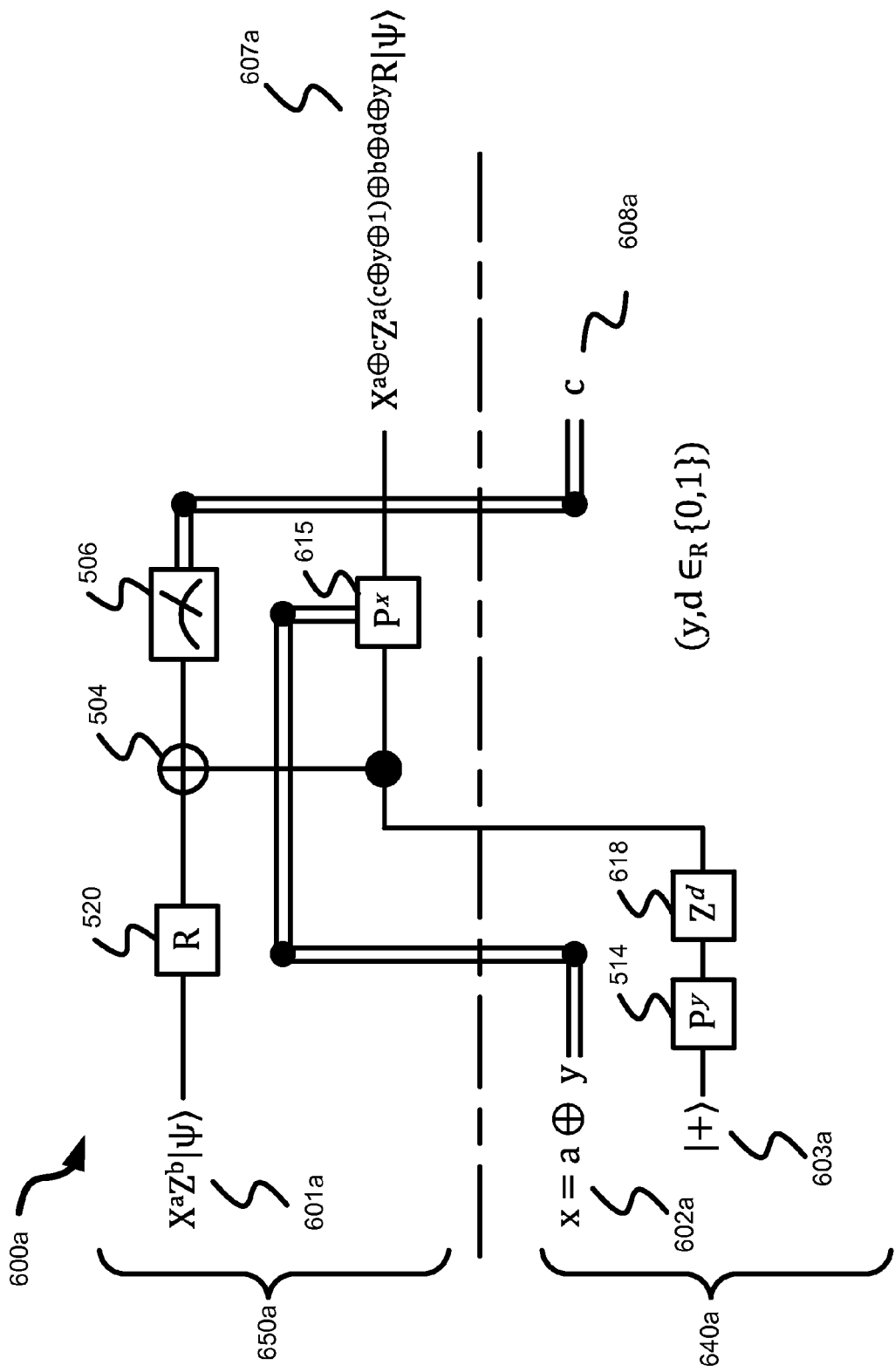
Figure 6B:
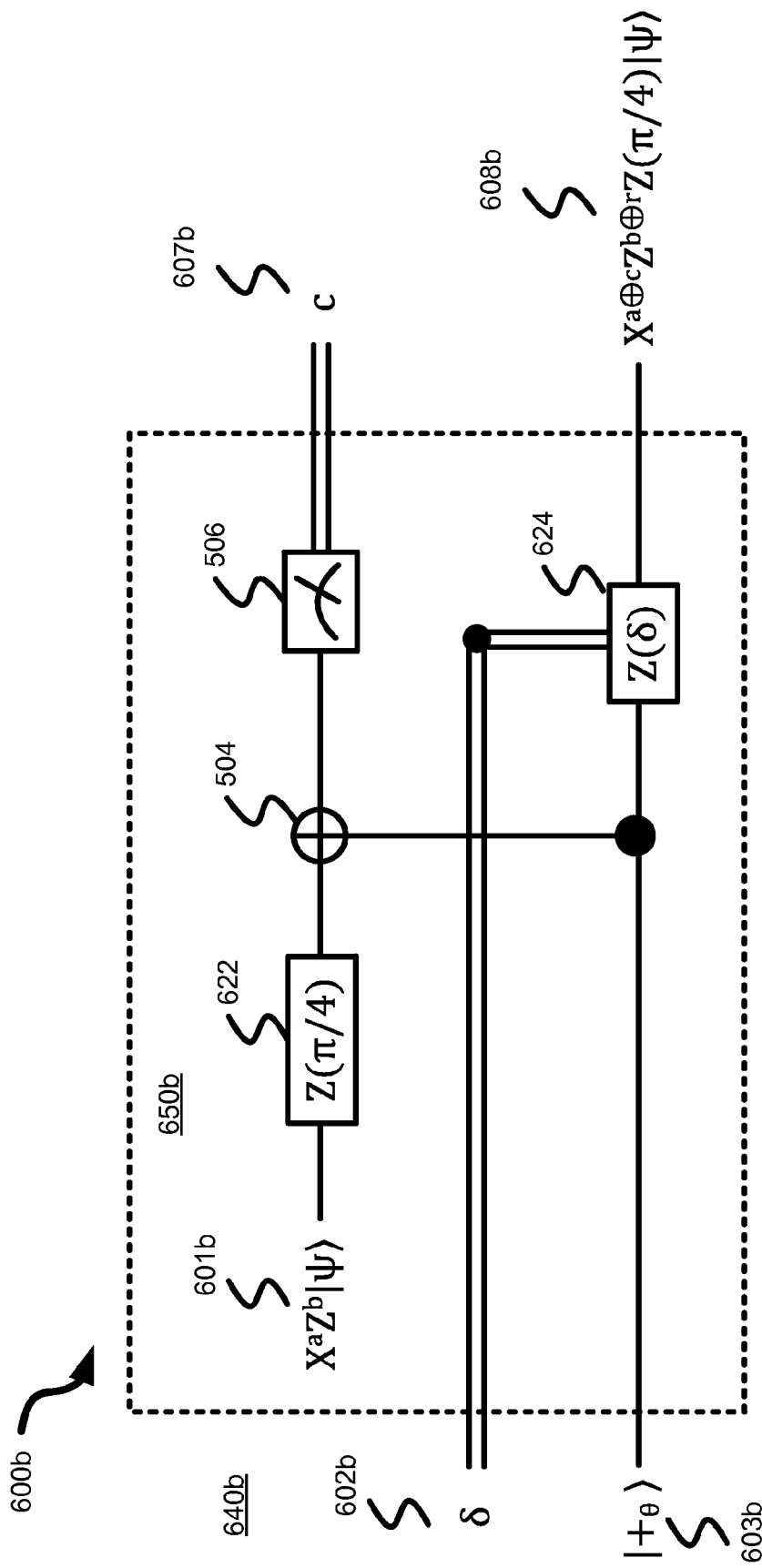

Some aspects of the present disclosure provide protocols for computing a $\pi/8$ gate over encrypted data (e.g., FIG. 6A, 6B). The example protocols can be implemented in a manner that is secure against a malicious server. A qubit-based protocol can be proved secure, for example, by transforming the protocol into an equivalent entanglement-based protocol.

Some aspects of the present disclosure provide protocols that can achieve the highest possible level of security (e.g., the same level of privacy as the quantum one-time pad) in some instances. For example, the security of the quantum one-time pad may depend only on the correctness of quantum mechanics, without reliance on computational assumptions.

Some aspects of the present disclosure can be used to perform a publicly-known circuit on encrypted data. Hiding the entire computation is possible, for example, by executing a universal circuit on an encrypted input, part of which contains the description of the target circuit to be implemented. Furthermore, the protocol can be adapted to allow the server to provide an input. Moreover, some aspects of the present disclosure can be used in the general scenario of two-party quantum computation, where both parties hold keys to the encrypted quantum data.

FIG. 1 is a schematic diagram showing aspects of an example computing system 100. The example computing system 100 includes computing devices 102, 104, a classical channel 106, and a quantum channel 108. The computing device 104 includes an encryption key 110; and the computing device 102 includes an encrypted state 112 and an auxiliary state 114. The example computing system 100 may include additional or different features having any suitable arrangement.

The computing devices 102, 104 can include any suitable types of computing devices. The computing devices 102, 104 generally include information processing apparatus and information storage. The information processing apparatus can include one or more quantum information processors, one or more classical processors, or any suitable combination. The information storage can include quantum storage media, classical storage media, or any suitable combination. In some implementations, one or both of the computing devices 102, 104 includes a quantum information processor, such as, for example, the quantum information processor 202 of FIG. 2. The computing devices 102, 104 can include additional features, such as, for example, a communication interface. In some implementations, the computing devices 102, 104 each include a classical data interface operable to communicate over the classical channel 106, and the computing devices 102, 104 each include a quantum data interface operable to communicate over the quantum channel 108.

The computing device 104 can encrypt an initial state using the encryption key 110. The initial state can be a classical state, a quantum state, or a combination of quantum and classical information. The encryption key 110 can include any suitable information. In some cases, the encryption key 110 is a classical bit string (i.e., a series of ones and zeros). In some cases, the encryption key 110 includes qubits. The computing device 104 can send the encrypted state to the computing device 102.

The computing device 102 receives and stores the encrypted state 112, for example, in a quantum register. The computing device 102 can manipulate the encrypted state 112, for example, using a quantum circuit or other suitable hardware. As such, the encrypted state 112 can evolve as the computing device 102 applies control operations to the quantum register.

The computing device 102 may use an auxiliary state 114 to apply one or more of the control operations to the encrypted state 112. The auxiliary state 114 can be any suitable quantum state. The auxiliary state 114 can be prepared by the computing device 104 or another device. The auxiliary state 114 can be randomly selected from a discrete set of specified input states. The discrete set can be specified as acceptable inputs, for example, by control logic at the computing device 102. For example, the auxiliary state 114 can be a single auxiliary qubit randomly selected from four quantum states. Or the auxiliary state 114 can include several auxiliary qubits each independently, randomly selected from four quantum states.

The encrypted state 112 and the auxiliary state 114 can be stored on one or more quantum registers at the computing device 102. For example, encrypted state 112 and the auxiliary state 114 can be stored on different portions of the same quantum register, or they may be stored in separate systems or different types of storage media.

The computing devices 102, 104 are communicably coupled to each other by the classical channel 106 and quantum channel 108. As such, the computing devices 102, 104 may interact by sharing classical information (e.g., classical bits) over the classical channel 106, or the computing devices 102, 104 may interact by sharing quantum information (e.g., qubits) over the quantum channel 108.

The computing devices 102 and 104 can be configured to interact with each other in any suitable manner. The computing devices 102, 104 can be configured as client and server. For example, the computing device 104 can operate as a client and the computing device 102 can operate as a server. In the client-server context, the client sends commands to the server, and the server sends responses to the client. The client may control some aspect of the server's operation, for example, by instructing the server to perform specified tasks. A server may interact with multiple clients, and a client may interact with multiple servers. The computing devices 102, 104 can be configured as peers. In the peer-to-peer context, peers can send commands to each other, and each peer can choose to respond to commands or ignore them. A peer may control some aspect of its peer's operation, for example, by instructing the peer to perform specified tasks. A computing device can interact with any suitable number of peers.

The classical channel 106 can be any suitable communication link or combination of links for sharing classical information. The classical channel 106 can be or include a direct communication link. Direct communication links include wired links, wireless links, and combinations thereof. For example, the classical channel 106 can include any suitable wires, ports, transport media, or connectors between the computing devices 102, 104. The classical channel 106 can be or include a communication network. Communication networks include wired networks, wireless networks, and combinations thereof. For example, the classical channel 106 can include any suitable local area network (LAN), wireless LAN, voice network, data network, or wide area network (e.g., the Internet) connecting the computing devices 102, 104. The classical channel 106 can be a private channel or a public channel.

The quantum channel 108 can be any suitable communication link or combination of links for sharing quantum information. The quantum channel 108 can include a direct communication link or a communication network. The quantum channel 108 can be an optical or photonic quantum channel, an electromagnetic channel, or any system capable of transmitting or transporting quantum information. The quantum channel 108 can be a private channel or a public channel.

In an example aspect of operation, the computing device 104 encrypts an initial state and sends the encrypted initial state to the computing device 102. The computing device 104 stores the encrypted state 112, obtains the auxiliary state 114, and uses the auxiliary state 114 to perform quantum computation on the encrypted state 112. In connection with the quantum computation, the computing device 102 sends the computing device 104 encryption-key-update messages, and the computing device 104 sends the computing device 102 control messages. The computing device 102 parameterizes its control sequence based on the control messages, and the computing device 104 updates its encryption key based on the encryption-key-update messages. After the quantum computation is complete, the computing device 102 sends the resulting encrypted state to the computing device 104. The computing device 104 uses its updated encryption key to decrypt the output of the quantum computation.

The computing system 100 shown in FIG. 1 is provided as an example. A computing system can include any suitable features, and the features of a computing system can be configured as discussed here in any other suitable manner.

Figure 2:
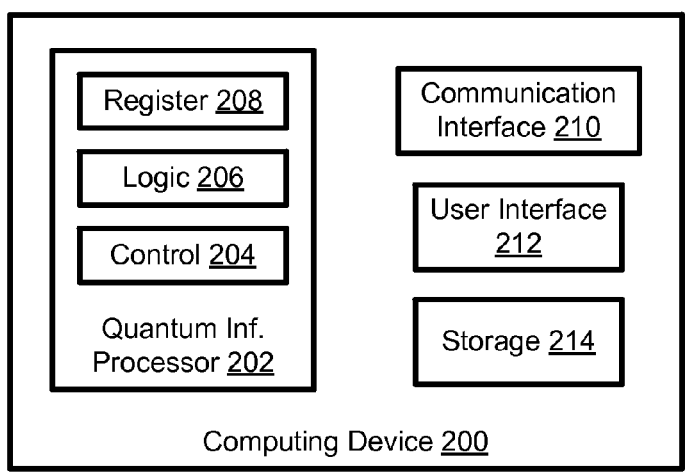
FIG. 2 is a schematic diagram showing aspects of an example computing device.

FIG. 2 is a schematic diagram showing aspects of an example computing device 200. The example computing device 200 includes a quantum information processor 202, a communication interface 210, a user interface 212, and storage 214. The example quantum information processor 202 includes control 204, logic 206, and a register 208. The computing device 200 may include additional or different features having any suitable arrangement.

The quantum information processor 202 can be any suitable data processing device or group of devices operable to process quantum information. The quantum information processor 202 can include any suitable hardware, software, firmware, or combinations thereof. The quantum information processor 202 can implemented using any suitable computing architecture or physical modality. The quantum information processor 202 may be programmed, or it may be programmable, to execute a quantum circuit or multiple quantum circuits. For example, the quantum information processor 202 may be programmed to execute some or all of the circuits shown in FIGS. 5A-5K and FIGS. 6A-6E. The quantum information processor 202 can be a universal quantum computer, or the quantum information processor 202 can be a quantum computer without universal quantum computation capabilities.

The quantum information processor 202 can store quantum information in a Hilbert space defined by a quantum system. The quantum information processor 202 can store any suitable number of qubits, and the Hilbert space can be any suitable size. For example, the quantum information processor 202 can store n qubits in a $2^n$-dimensional Hilbert space. The quantum information processor 202 can perform quantum computing operations that manipulate the quantum information in the Hilbert space. For example, the quantum information processor 202 may coherently control the quantum system and preserve the relative phases of the qubits. If the quantum information processor 202 is a universal quantum computer, it can create any coherent state in the Hilbert space. The quantum information processor 202 can be configured to measure the state of the quantum system in any suitable basis. For example, the quantum information processor 202 may be configured to measure one or more of the qubits in a computational basis.

The quantum information processor 202 can be configured to perform unitary operations, measurement operations, or any suitable combination of these and other operations. Unitary operations can be applied to individual qubits, pairs of qubits, any suitable subset of qubits, or a unitary operation can be applied to an entire quantum register. A unitary operation can be represented as time-evolution under a Hamiltonian, and can preserve the purity of an initial quantum state. When the state of a quantum system is represented as a density matrix, a unitary operation can be represented as a unitary operator acting on the density matrix. The unitary operator can preserve the trace norm of the density matrix. To the extent that two qubits have relative phases, a unitary operation acting on the qubits may preserve the relative phase of the qubits; or a unitary operation may create a relative phase among qubits. The quantum information processor 202 can be configured to perform any suitable unitary operations.

Measurement operations can be applied to individual qubits, pairs of qubits, any suitable subset of qubits, or a unitary operation can be applied to an entire quantum register. A measurement operation is an example of a non-unitary operation. Other examples of non-unitary operations include decoherence and entanglement of a quantum state with its environment. A measurement operation applied to a quantum state can be represented as a projection of the quantum state in a particular basis. A measurement can produce classical information. For example, the result of measuring a single qubit can be a classical bit—a one or a zero. The result of measuring multiple qubits can be a series of classical bits.

A measurement operation applied to a quantum system can change the state of the quantum system. For example, before measuring a qubit, the qubit may have any linear combination of states in a computational basis; after measuring the qubit in the computational basis, the state of the qubit has one of the qubit's two computational basis states. In particular, the state of the qubit after the measurement is the computational basis state indicated by the measurement. The measurement may also affect the states of other qubits that were not measured. For example, if qubits are entangled, measuring one qubit can modify the state of the other entangled qubits. Measuring an entangled qubit can destroy the qubit's entanglement with other qubits.

The register 208 can include any suitable hardware, media, or systems. The register 208 can store the computational state of the quantum information processor. For example, the register 208 can be a quantum register that stores a quantum state. The quantum register can be an n-qubit quantum register that defines a $2^n$-dimensional Hilbert space. The register 208 can include multiple registers, which may include any suitable combination of quantum systems. In some instances, the register 208 is a wholly-quantum register. In some cases, the register 208 may store classical information as well as quantum information. For example, the register 208 may include one or more classical bits. The register 208 can include register qubits. In some examples, the register 208 stores an encrypted quantum state, an auxiliary quantum state, or any suitable combination of these and other quantum states.

The computational state of the register 208 may evolve over time as the register is manipulated. For example, an initial state can be encoded in the register 208, and the register 208 may be manipulated over time by a quantum circuit or other operations applied to the register 208. The resulting state of the register 208 can represent the output of the quantum circuit or the output of a quantum computation. The resulting state can be maintained at the register 208 and used for further computation, or the resulting state can be decoded from the register 208 and stored, communicated, or used in another manner.

The logic 206 can include any suitable hardware, software, or systems. The logic 206 can include programmed circuits or programmable circuits that can be applied to the register 208. For example, the logic 206 can include hardware or systems configured to perform some or all of the quantum circuits shown in FIGS. 5A-5K and 6A-6E. The logic 206 can be programmed, or it can be programmable, to perform unitary operations, measurement operations, or other types of operations. In some cases, the logic 206 are configured to perform classical computation on a classical portion of the register 208 and to perform quantum computation on a quantum portion of the register 208.

The logic 206 can manipulate the register 208 in any suitable manner. In some implementations, the logic 206 can access the states of individual qubits in the register 208 as inputs and process the inputs by applying a quantum circuit. In some implementations, the logic 206 can access inputs from sources other than the register 208. For example, the logic may access inputs from an auxiliary system, data storage, an interface, etc. By processing the inputs, the logic 206 produces one or more outputs. The outputs can be stored on the register 208 or any other suitable media. The outputs may include classical information, quantum information, or any suitable combination. In some cases, one or more of the outputs is placed in a register, an auxiliary system, or storage, or one or more of the outputs can be sent to a remote system, etc.

The control 204 can include any suitable hardware, software, or systems. The control 204 can control the interaction between the logic 206 and the register 208, or the control 204 can control other aspects of the quantum information processor 202. For example, the control 204 may select a particular circuit to be applied to a particular set of register qubits. The control 204 may include, or may operate on, a clock signal that determines the speed of the quantum information processor 202.

The communication interface 210 can include any suitable hardware or systems. The communication interface 210 can be communicably coupled with a quantum channel, a classical channel, or any suitable combination. For example, the communication interface 210 may be configured to send or receive classical information, quantum information, or both. The communication interface 210 may communicate with any suitable external systems or devices.

The communication interface 210 can be configured to execute communication protocols. For example, the communication interface 210 can be programmed to execute instructions or send certain types of information in response to requests or commands, and the communication interface 210 can be programmed to send commands or requests for certain types of information. In some cases, the communication interface 210 can be configured to execute quantum communication protocols, such as, for example, a quantum teleportation protocol.

The user interface 212 can include any suitable hardware or systems. For example, if the computing device 200 is a user device, the user interface 212 may include a display device, a pointing device, any suitable tactile input devices, etc.

The storage 214 can include any suitable hardware, media, or systems. The storage 214 may store quantum information, classical information, or any suitable combination. The storage 214 may be used for long-term storage, and may have a larger capacity, for example, than the register 208. In some instances, the quantum information processor 202 can write information to and retrieve information from the storage 214.

The computing device 200 shown in FIG. 2 is provided as an example. A quantum computer can include any suitable features, and the features of a quantum computer can be configured as discussed here in any other suitable manner. A quantum computer can include multiple computing devices, as well as other hardware and systems. In some cases, a quantum computer includes multiple quantum information processors, multiple classical information processors, or any suitable combination of classical an quantum processors. A quantum computer can include multiple systems that are communicably coupled to each other and operate relatively independently from each other. As such, a quantum computer can be a distributed system. Similarly, a quantum information processor can be implemented as a distributed system or as multiple systems, as opposed to a discrete piece of hardware.

Figure 3:
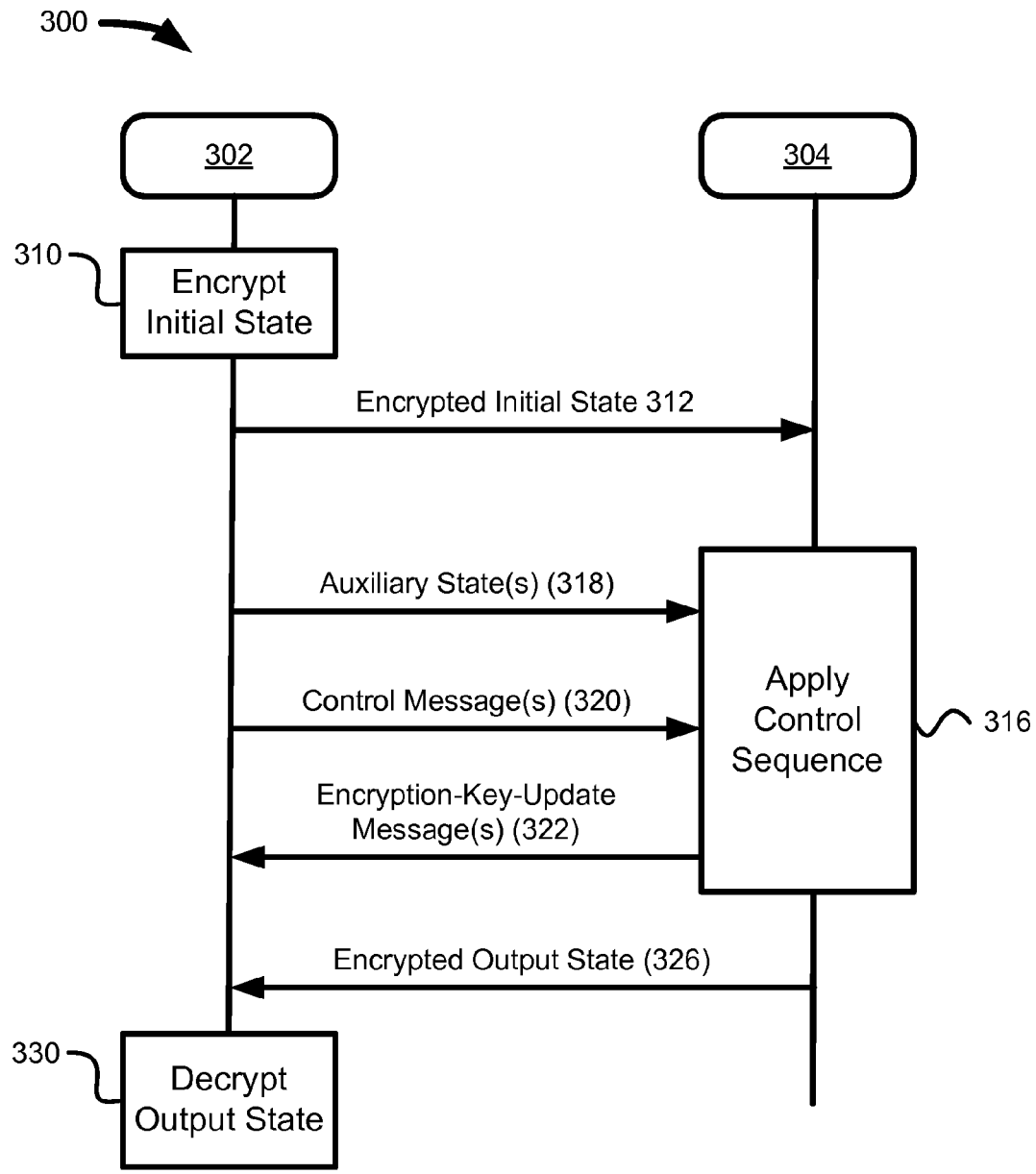
FIG. 3 is a communication and flow diagram showing an example quantum computing process.

FIG. 3 is a communication and flow diagram showing an example quantum computing process 300. The example process 300 can be performed by any suitable system, device, or apparatus. In some implementations, the process 300 can be implemented on a computing system that includes one or more communication channels and one or more quantum information processors. For example, the process 300 may be performed by the computing system 100 shown in FIG. 1 or by any other suitable system.

The example process 300 can include the operations shown in FIG. 3, or the process 300 can be modified to include additional, different, or fewer operations. The operations in the process 300 may be performed in the order shown in FIG. 3, or the operations can be performed in another order. In some instances, one or more operations can be repeated or iterated, for example, until a specified condition is reached.

In the example shown in FIG. 3, the example quantum computing process 300 includes operations performed by computing devices 302, 304. The process 300 can be performed by any suitable hardware, including any suitable number of computing devices. The computing devices 302, 304 can be the computing devices 102, 104 shown in FIG. 1, or the computing devices 302, 304 can include any suitable types of classical or quantum computing devices. The computing device 304 can include one or more quantum information processors, such as, for example, the quantum information processor 202 shown in FIG. 2 or another type of quantum information processor.

The computing devices 302, 304 can communicate over any suitable channel or link, as appropriate. In some implementations, the computing devices 302, 304 can communicate with each other over one or more classical channels, one or more quantum channels, or any suitable combination. In some implementations, the computing devices 302, 304 can communicate with each other over one or more direct communication links, one or more communication networks, or any suitable combination. The computing devices 302, 304 may be configured to communication as peers, as client and server, or in any other suitable manner.

At 310, the computing device 302 encrypts an initial state. The initial state can be a classical state or a quantum state. The initial state can be encrypted by any suitable encryption technique (e.g., by a one-time quantum pad, etc.). The initial state can be encrypted based on an encryption key. In some instances, the encrypted initial state can be determined from the unencrypted initial state, the encryption key, and the encryption algorithm. The computing device 302 can store the encryption key. For example, the encryption key may be stored in a secure local storage at the computing device 302. In some instances, the encryption key is a secret key that is only known to the computing device 302.

In some cases, the encrypted initial state represents the input for a quantum computing algorithm or quantum circuit. In some implementations, the quantum circuit to be applied is determined independent of the encrypted initial state. In some cases, part of the encrypted initial state controls or selects the quantum computing algorithm or quantum circuit to be applied. For example, a first portion of the initial state may specify the quantum circuit to be applied, and a second portion of the initial state may specify the input for the quantum circuit.

At 312, the computing device 302 sends (and the computing device 304 receives) the encrypted initial state. The encrypted initial state can be sent over any suitable channel (e.g., quantum, classical, or combination) or communication link (e.g., direct link, communication network, etc.). In some instances, the encrypted initial state is sent by quantum teleportation or another suitable technique. After receiving the encrypted initial state, the computing device 304 can store the encrypted initial state in a quantum register. For example, the encrypted initial state may be encoded in the register of a quantum information processor or any other suitable quantum register.

In some implementation, the computing device 304 supplies additional input information. For example, the computing device 304 may contribute an additional input state, or the computing device 304 can add information to the encrypted initial state received from the computing device 302. In some cases, the encrypted initial state provided by the computing device 302 can be processed securely at the computing device 304, while additional input provided by the computing device 304 is not protected.

At 316, the computing device 304 applies a control sequence. The control sequence can include any suitable combination of operations. In some implementations, the control sequence includes one or more of the operations represented in FIGS. 5A-5K or 6A-6E. The control sequence may include other types of operations. The computing device 304 can use any suitable systems or hardware to apply the control sequence. Two example techniques for applying a sequence of operations are illustrated by the processes 400 and 420 shown in FIGS. 4A and 4B, respectively. Additional or different techniques may be used.

The control sequence applied at 316 can include one or more operations that are applied to the quantum register where the encrypted initial state was stored. For example, the operations may be applied to one or more of the encrypted register qubits. The control sequence may manipulate the encrypted initial state provided by the computing device 302. In some instances, other operations are applied to the encrypted initial state before the control sequence is applied at 316. As such, the control sequence may manipulate a subsequent encrypted state derived from the encrypted initial state. In any event, the control sequence manipulates one or more encrypted qubits in the encrypted state stored on the quantum register.

The control sequence can include one or more operations that are applied to an auxiliary quantum state. For example, the control sequence may be configured to accept one or more auxiliary qubits as input, and the control sequence may apply one or more operations to the auxiliary qubits. The auxiliary quantum state can be stored on a quantum register, and the control sequence can include one or more operations that are applied to the qubits where the auxiliary state was stored.

In some instances, the hardware or software that performs the control sequence at 316 specifies a particular set of auxiliary quantum states that are acceptable as inputs. For example, the sequences performed by the second entities 650a and 650b shown in FIGS. 6A and 6B are configured to operate based on receiving an auxiliary qubit having any one of the following states:

$$\left\{ \frac{1}{2}(|0\rangle + |1\rangle), \frac{1}{\sqrt{2}}(|0\rangle + i|1\rangle), \frac{1}{\sqrt{2}}(|0\rangle - |1\rangle), \frac{1}{\sqrt{2}}((|0\rangle + i|1\rangle)) \right\}.$$

The particular auxiliary quantum state that is provided to the control sequence may be selected at random from the acceptable set of states. For example, the first entity 640a in FIG. 6A and the first entity 640b in FIG. 6B are configured to prepare an auxiliary qubit randomly selected from these four states, and to send the prepared auxiliary qubit to the second entities 650a and 650b.

Any suitable set of auxiliary states may be used. The auxiliary qubit may be selected from a set that is unitarily equivalent to the set $\{|0\rangle, 1\rangle, |+\rangle, |-\rangle\}$. A first set of state is unitarily equivalent to a second set of states, for example, if the second set of states can be generated by applying a common unitary operation to the first set of states. For example, the auxiliary states may correspond to any rotated version of the set $$\left\{\frac{1}{2}(|0\rangle+|1\rangle), \frac{1}{\sqrt{2}}(|0\rangle+i|1\rangle), \frac{1}{\sqrt{2}}(|0\rangle-|1\rangle), \frac{1}{\sqrt{2}}((|0\rangle+i|1\rangle)\right\}.$$

Or the set of acceptable states may include a different number of states (e.g., more than four, less than four, etc.) depending on the context.

At 318, the computing device 302 sends (and the computing device 304 receives) one or more auxiliary states. The auxiliary states can be obtained from the computing device 302 or from another system. In some implementations, the computing device 302 prepares and sends the auxiliary state to the computing device 304. In some implementations, a trusted third party prepares and sends the auxiliary state to the computing device 304. The auxiliary states can be provided to the computing device 304 over a quantum channel in any suitable format.

At 320, the computing device 302 sends (and the computing device 304 receives) one or more control messages. A control message can include any suitable type of information (e.g., classical, quantum, or combination) in any suitable format. The control message can include control information (e.g., one or more control bits) to parameterize a control operation in the sequence of operations applied to the encrypted state. For example, the control information may be used as a parameter of a unitary gate applied to an encrypted register qubit. In the example shown in FIG. 6A, the input 602a is provided to the second entity 650a as a control message; and in the example shown in FIG. 6B, the input 602b is provided to the second entity 650b as a control message. The control message can be a classical bit (or a classical bit string) generated by the computing device 302. Other types of control messages may be used. The information in the control message can be generated, for example, by a classical or quantum random number generator, or by any other suitable algorithm. The information in the control message can be calculated, for example, based on one or more encryption-key-update messages, one or more randomly generated values, or other information.

At 322, the computing device 304 sends (and the computing device 302 receives) one or more encryption-key-update messages. A encryption-key-update message can include any suitable type of information (e.g., classical, quantum, or combination) in any suitable format. The encryption-key-update messages can include information (e.g., one or more bits or qubits) for updating an encryption key that was used to encrypt the initial state (at 310). In some implementations, the computing device 304 generates one or more of the encryption-key-update messages based on the state of the encrypted register, based on the state of an auxiliary quantum system, or based on other information. In some implementations, the computing device 304 generates one or more of the encryption-key-update messages based on operations applied to the encrypted register, operations applied to the auxiliary quantum system, or other operations.

The encryption-key-update message can include a classical bit (or string of classical bits) generated by the computing device 304. The classical bit or string of bits can be generated by measurement or any other suitable technique. For example, the information in the encryption-key-update message can be generated by measuring one or more qubits of the encrypted quantum register, by measuring one or more qubits of an auxiliary quantum system, etc. In the example shown in FIG. 6A, the output 608a is extracted by a measurement gate 506 and can be included in an encryption-key-update message; and in the example shown in FIG. 6B, the output 607b is extracted by a measurement gate 506 and can be included in an encryption-key-update message. A encryption-key-update message can include additional or different information.

An encryption-key-update message can indicate parameters or instructions for updating an encryption key, and the updated encryption key can be used to decrypt an output. For example, information included in the encryption-key-update messages, when combined with the encryption key, may enable decryption of the output state. In some implementations, the encryption-key-update messages and the encryption key itself are both needed to decrypt the output state produced by the sequence of operations. In some instances, the output state cannot be decrypted from the encryption-key-update messages taken alone (i.e., without the encryption key). In some instances, earlier (i.e., non-updated) versions of the encryption key cannot be used to decrypt the output state without the encryption-key-update information.

In FIG. 3, the auxiliary states, the control messages, and the encryption-key-update messages are shown as being communicated during application of the control sequence at 316. More generally, any subset of these and other data or any combination of them may be communicated at any suitable time before, after, or during application of the control sequence. Some or all of the auxiliary states can be received by the computing device 304 before the control sequence is applied or during application of the control sequence at 316. Some or all of the control messages can be received by the computing device 304 before the control sequence is applied or during application of the control sequence at 316. Some or all of the encryption-key-update messages can be sent by the computing device 304 after the control sequence is applied or during application of the control sequence at 316. Moreover, some or all of the control messages may be received before or after some or all of the encryption-key-update messages are sent. Other information, including additional or different types of messages, can be exchanged between the computing devices 302 and 304 in connection with the control sequence 316.

In some instances, operations can be applied to the encrypted state independent of interactions between the computing devices 302 and 304. For example, a quantum circuit involving Clifford group gates (or other types of circuits, as appropriate) may be applied to the encrypted state without the use of an auxiliary state, a control message, or an encryption-key-update message, as shown in FIGS. 5D-5J.

The computing device 302 updates the encryption key based on the encryption-key-update messages. For example, the computing device may produce an updated encryption key from the encryption-key-update information and the initial encryption key that was used to encrypt the initial state at 310. In some instances, the computing device 302 updates the encryption key multiple times. For example, the computing device 302 may receive multiple encryption-key-update messages and update the encryption key each time an individual encryption-key-update message is received.

In some implementations, the computing device 302 generates one or more of the control messages based on the encryption key or an encryption-key-update message. In some implementations, the computing device 302 generates one or more of the auxiliary states based on the encryption key or an encryption-key-update message.

The encryption key can be maintained as a secret at the computing device 302. For example, the control messages and the auxiliary qubits can be sent over a public channel without exposing the encryption key to the computing device 304 or other parties. As such, the computing device 304 may execute the entire control sequence 316 and return the encrypted output state to the computing device 302 without the encryption key, or any part of the encryption key, being compromised or exposed to adversaries or the computing device 304.

At 326, the computing device 304 sends (and the computing device 302 receives) an encrypted output state. The encrypted output state can be sent over any suitable public or private channel (e.g., quantum, classical, or combination), which may include any suitable communication links (e.g., direct link, communication network, etc.). In some instances, the encrypted output state is sent by quantum teleportation or another suitable technique. After receiving the encrypted output state, the computing device 302 can store the encrypted output state, for example, in a quantum register or any suitable hardware.

At 330, the computing device 302 decrypts the output state. The output state can be decrypted by any suitable decryption technique (e.g., by a one-time quantum pad, etc.). The decryption can be performed using a decryption algorithm that is complementary to the encryption algorithm that encrypted the initial state 310. For example, the decryption algorithm can be the inverse of the encryption algorithm. The decryption can be performed using the updated encryption key. For example, the computing device 302 can update the encryption key based on the encryption-key-update messages, and the computing device 302 can decrypt the encrypted output state using the updated encryption key.

The decryption can generate a decrypted output state. In some instances, the decrypted output state can be determined from the encrypted output state, the updated encryption key and the decryption algorithm.

Figure 4A:
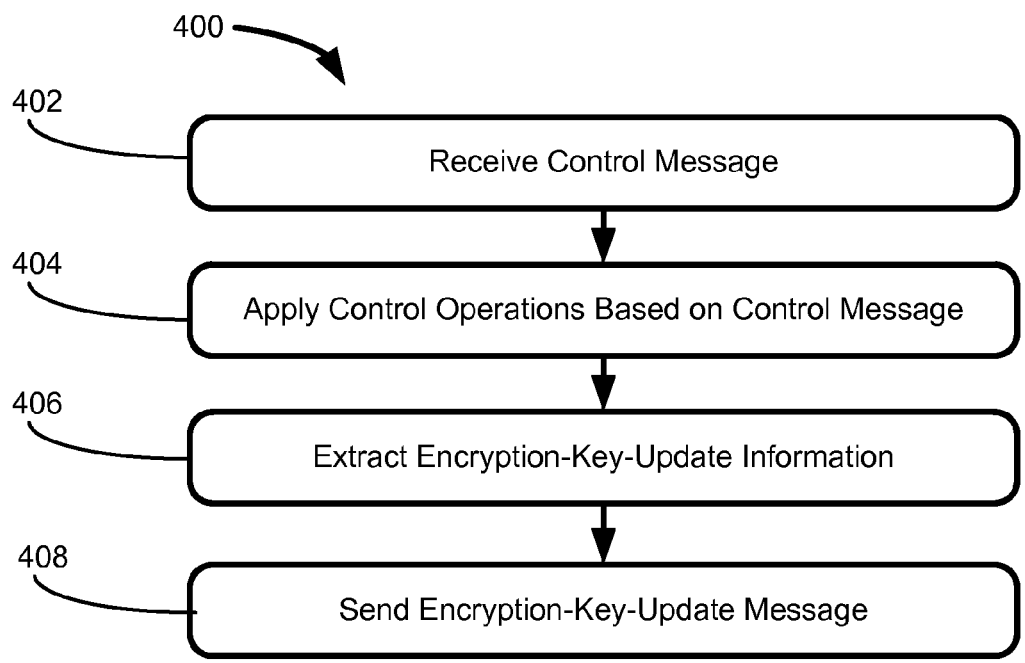
FIGS. 4A and 4B are a flow diagrams showing example processes for quantum computing on encrypted states.
Figure 4B:
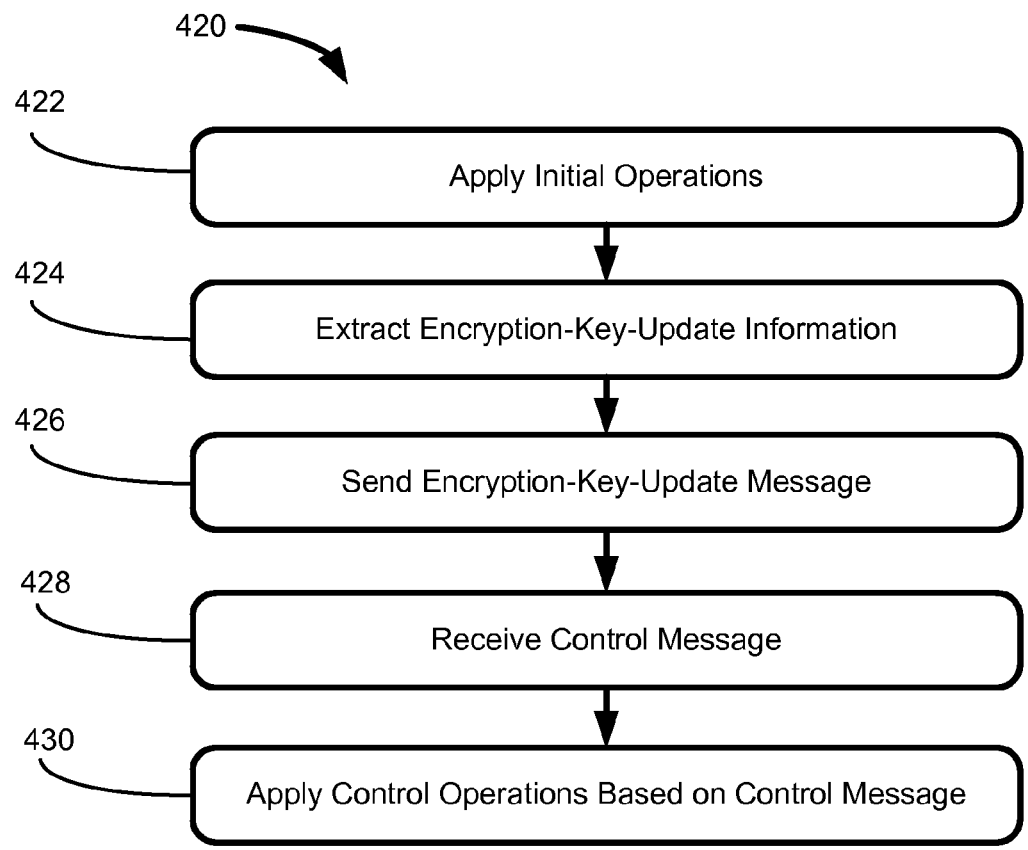

FIGS. 4A and 4B are a flow diagrams showing example processes 400, 420 for quantum computing on an encrypted state. The processes 400, 420 can be performed by any suitable system, device, or apparatus. In some implementations, the processes 400, 420 can be implemented on a computing system that includes one or more quantum information processors. For example, the processes 400, 420 may be performed in the computing system 100 shown in FIG. 1, in the computing device 200 shown in FIG. 2, or by any other suitable system.

The example processes 400, 420 can include the operations shown respectively in FIGS. 4A and 4B, or the processes 400, 420 can be modified to include additional, different, or fewer operations. The operations in the processes 400, 420 may be performed in the orders shown respectively in FIGS. 4A and 4B, or the operations can be performed in another order. In some instances, one or more operations can be repeated or iterated, for example, until a specified condition is reached.

Either of the example processes 400, 420 can be implemented in combination with one or more other processes or techniques. For example, in some implementations, either process 400 or process 420 can be used to implement one or more of the operations performed by the computing device 304 shown in FIG. 3. The example processes 400, 420 can be used in other contexts. In some cases, either of the example processes 400, 420 can be implemented by itself (i.e., independent of each other, independent of other processes, etc.).

In some contexts, the example processes 400, 420 may be viewed as alternative techniques or as complementary techniques. The example process 400 shown in FIG. 4A shows a scenario where the control message is received before the encryption-key-update message is sent. The example process 420 shown in FIG. 4B shows a scenario where the control message is received after the encryption-key-update message is sent. Any suitable variation or combination on these techniques may be used, as appropriate.

In some implementations, the example processes 400, 420 are used to implement delegated quantum computation on encrypted data. For example, before the example processes 400, 420 are performed, one or more inputs (e.g., an encrypted state) can be obtained from a correspondent. The example processes 400, 420 can implement a quantum gate, a quantum circuit or multiple quantum circuits on the encrypted state provided by the correspondent. The example processes 400, 420 may implement a non-Clifford gate. For example, the example process 400 may be used to implement the R-gate as shown in FIG. 6A, and the example process 420 may be used to implement the R-gate as shown in FIG. 6B. The example processes 400, 420 can be used to implement additional or different types of computing operations.

As shown in FIG. 4A, at 402, a control message is received. The control message can be received from a correspondent in association with an encrypted state provided by the correspondent. The control message can include input (e.g., one or more control bits) for a control operation to be applied to the encrypted state. For example, the control message can include information that is used to parameterize a quantum gate.

At 404, control operations are applied based on a control message. The control operations can be applied to the encrypted state provided by the correspondent. The control operations can be applied to an auxiliary quantum state provided by the correspondent or another source. The control operations may include one or more unitary operations parameterized by the control message. When a control operation is parameterized by a control message, some aspect of the control operation is determined by the control message. For example, the control operation can be a unitary rotation by an angle of rotation, where the angle is determined based (wholly or partially) on the control message. As another example, the control operation can be a controlled unitary rotation by an angle of rotation, where the angle is determined based (wholly or partially) on the control message. As another example, the control operation can be any suitable one-qubit gate or a two-qubit gate that is either applied or not applied depending on the content of the control message. After the control operations are applied, the encrypted output state can be stored locally or sent to the correspondent.

At 406, encryption-key-update information is extracted. The encryption-key-update information can be extracted from one or more qubits of the encrypted state or from one or more qubits of an auxiliary system, after one or more of the control operations are applied. In some implementations, the encryption-key-update information is extracted by measuring one or more qubits of the encrypted state, by measuring one or more qubits of an auxiliary state, or by any suitable operation.

At 408, an encryption-key-update message is sent. The encryption-key-update message includes the encryption-key-update information extracted at 406. The encryption-key-update message can be sent to the correspondent that provided the encrypted state.

After the encryption-key-update message is sent to the correspondent, the correspondent can use the encryption-key-update information to produce an updated encryption key. In some implementations, the correspondent obtains the encrypted output state produced by the control operations, and the correspondent decrypts the output state using the updated encryption key.

A different process 420 is shown in FIG. 4B. The process 420 can be implemented instead of or in addition to the process 400 of FIG. 4A. As shown in FIG. 4B, at 422, one or more initial operations are applied. The initial operations can be applied to an encrypted state provided by the correspondent. The operations can include any suitable gates, circuits, or other operations.

At 424, encryption-key-update information is extracted. The encryption-key-update information can be extracted from one or more qubits of the encrypted state or from one or more qubits of an auxiliary system, after the initial operations are applied at 422. In some implementations, the encryption-key-update information is extracted by measuring one or more qubits of the encrypted state, by measuring one or more qubits of an auxiliary state, or by any suitable operation.

At 426, an encryption-key-update message is sent. The encryption-key-update information includes the encryption-key-update information extracted at 424. The encryption-key-update message can be sent to the correspondent.

At 428, a control message is received. The control message can be received from the correspondent in response to the encryption-key-update message. The correspondent can generate the control message based at least in part on the encryption-key-update message. The control message can include input (e.g., one or more control bits) for a control operation to be applied to the encrypted state. For example, the control message can include information that is used to parameterize a quantum gate.

At 430, control operations are applied based on the control message. The control operations can be applied to the encrypted state from the correspondent. The control operations can be applied to an auxiliary quantum state provided by the correspondent or another source. The control operations may include one or more unitary operations parameterized by the control message.

After the control operations are applied, the encrypted output state can be sent to the correspondent. The correspondent can use the encryption-key-update information to produce an updated encryption key, and decrypt the output state using the updated encryption key.

FIGS. 5A-5K are schematic diagrams showing several example quantum circuits. Each of the example quantum circuits (500a, 500b, 500c, 500d, 500e, 500f, 500g, 500h, 500i, 500j, 500k) shown in FIGS. 5A-5K are provided as examples of operations that can be used to perform specified computing tasks. In some cases, the quantum circuits can be modified, for example, where such modification is appropriate for a particular implementation, architecture, or computing environment. The example quantum circuits shown in FIGS. 5A-5K can be performed by any suitable hardware, software, or combinations thereof.

The quantum circuits (500a, 500b, 500c, 500d, 500e, 500f, 500g, 500h, 500i, 500j, 500k) are represented as combinations of single-qubit gates acting on individual qubits and two-qubit gates acting on pairs of qubits. The quantum gates shown in FIGS. 5A-5K include a controlled-not gate 504, a measurement gate 506, a P-gate 510, an H-gate 512, a P$^y$-gate 514, an X-gate 516, a Z-gate 518, and an R-gate 520. In some implementations, the computing tasks can be performed using additional, fewer, or different operations, which may include other quantum gates. In some implementations, multiple gates can be combined and performed as a single gate, or a single gate can be decomposed and performed as multiple gates. Moreover, the quantum gates, and any other operations, can be performed in the order shown or in another suitable order.

The figures and the accompanying discussion use the following notation:

$$|+\rangle = \frac{1}{\sqrt{2}}(|0\rangle + |1\rangle),$$

Pauli gates are represented X: $|j\rangle \mapsto |j\oplus 1\rangle$ 1 and Z: $|j\rangle \mapsto (-1)^j|j\rangle$, and the single-qubit Hadamard and phase gates are represented H: $|j\rangle \mapsto 1/\sqrt{2}(|0\rangle + (-1)^j|1\rangle)$, P: $|j\rangle \mapsto (i)^j|j\rangle$, where $i=\sqrt{-1}$. The two-qubit controlled-not gate is represented CNOT: $|j\rangle |k\rangle \mapsto |j\rangle |j\oplus k\rangle$, and an EPR-pair can be the maximally entangled qubit bit pair, $$\frac{1}{\sqrt{2}}(|00\rangle + |11\rangle).$$

The P$^y$ gate is represented P$^y$: $|j\rangle \mapsto (i)^{j \cdot y}|j\rangle$. As such, the P$^y$ gate applies the phase gate (P) when y=1, and the Py gate applies the identity otherwise (when y≠1).

The Clifford Group is a set of operators that conjugate Pauli operators into Pauli operators. A universal gate set for Clifford group circuits is composed of the Pauli gates themselves, together with H, P and CNOT. Stabilizer circuits can be formed by adding the operations of single-qubit measurements and auxiliary qubit preparation to the Clifford group circuits. Stabilizer circuits are not universal for quantum computation. Supplementing stabilizer circuits with any additional gate outside of the group (such as R: $|j\rangle \mapsto e^{ij\pi/4}|j\rangle$) or the Toffoli gate T: $|j\rangle |k\rangle |l\rangle \mapsto |j\rangle |k\rangle |l\oplus jk\rangle$) is sufficient for universality. The present disclosure refers interchangeably to the R-gate as the π/8 gate. As such, the R-gate is a single-qubit rotation by an angle of π/8. Any suitable non-Clifford group gate may be used, and the R-gate is shown here as an example.

The following identities (which all hold up to an irrelevant global phase) are also used in the figures and the accompanying discussion: XZ=ZX, PZ=ZP, PX=XZP, RZ=ZR, RX=XZPR, P$^2$=Z and P$^{a\oplus b}$=Z$^{a \cdot b}$P$^{a+b}$ (for a,b∈{0, 1}). In the examples shown in FIGS. 5A-5K and 6A-6E, measurements are performed in the computational basis. In some instances, measurements may be performed in another suitable basis.

The controlled-not gate 504 is an example of a multi-qubit unitary operation. The controlled-not gate 504 shown here is applied to two qubits. The P-gate 510, the H-gate 512, the P$^y$-gate 514, the X-gate 516, the Z-gate 518, and the R-gate 520 are all examples of single-qubit unitary operations; these gates are applied to single qubits. The measurement gate 506 is an example of a non-unitary operation. Measurement of a qubit extracts a classical bit from the qubit. The measurement operation in the computational basis converts (or collapses) the measured qubit to the computational basis state indicated by the classical bit. The quantum state before the measurement gate 506 is represented in the figures by a single line (a quantum wire), and the classical information extracted from the measurement gate 506 is represented in the figures by a double line (a classical wire).

Figure 5A:
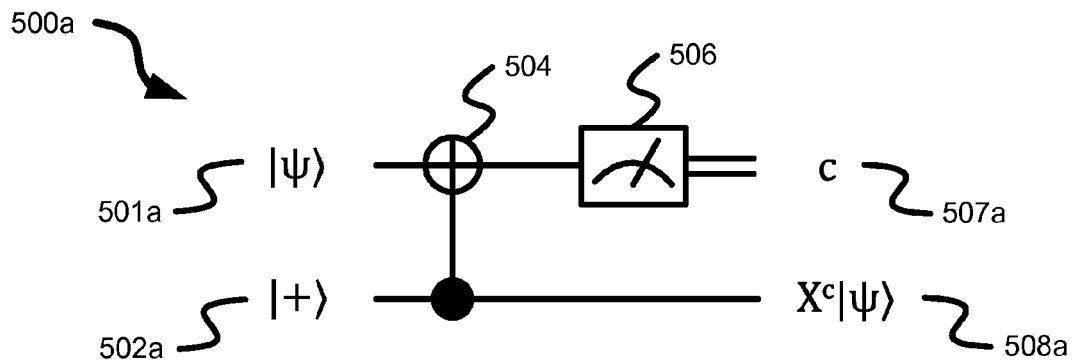
FIGS. 5A-5K are schematic diagrams showing example quantum circuits.

FIG. 5A shows an example of a quantum circuit 500a representing X-teleportation. The quantum circuit 500a operates on inputs 501a and 502a and produces outputs 507a and 508a. In the example shown in FIG. 5A, the inputs 501a and 502a are the quantum states $|\psi\rangle$ and $|+\rangle$, respectively; and the outputs 507a and 508a are the classical bit c and the quantum state X$^c|\psi\rangle$, respectively. The quantum circuit 500a may operate on other appropriate inputs and, accordingly, may produce other appropriate outputs. The quantum circuit 500a includes the controlled-not gate 504 and a measurement gate 506. In some implementations, additional or different operations can be used to perform X-teleportation. Moreover, the quantum circuit 500a can be modified to perform the same or different computing tasks.

Figure 5B:
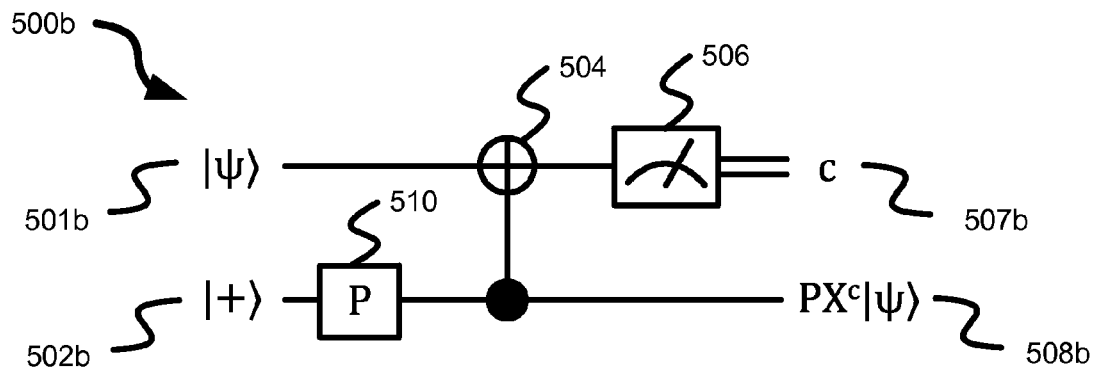

FIG. 5B shows an example quantum circuit 500b demonstrating that the P-gate 510 commutes with the X-teleportation control operations shown in FIG. 5A. The quantum circuit 500b operates on inputs 501b and 502b and produces outputs 507b and 508b. In the example shown in FIG. 5B, the inputs 501b and 502b are the quantum states $|\psi\rangle$ and $|+\rangle$, respectively; and the outputs 507b and 508b are the classical bit c and the quantum state $PX^c|\psi\rangle$, respectively. The quantum circuit 500b may operate on other appropriate inputs and, accordingly, may produce other appropriate outputs.

Figure 5C:
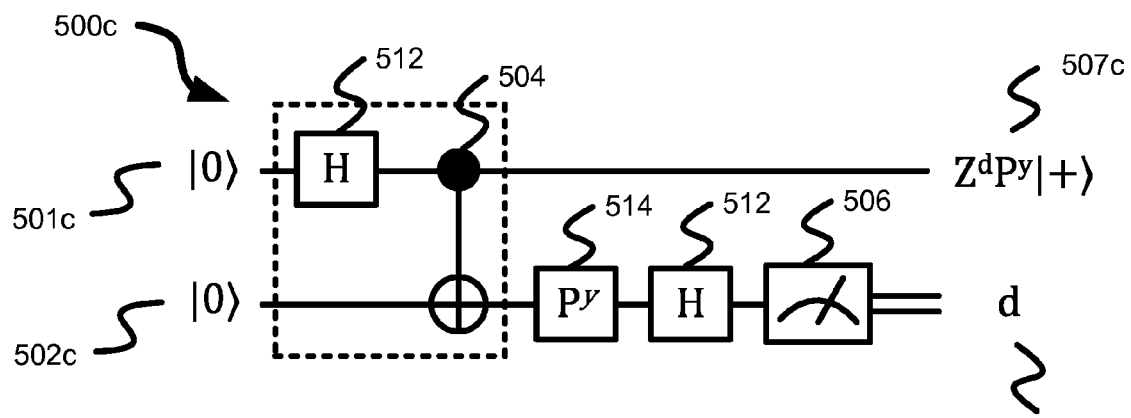

FIG. 5C shows an example of a quantum circuit 500c preparing a qubit $Z^d P^y|+\rangle$ for uniformly random bits y and d. The quantum circuit 500c is an entanglement-based circuit. Here, y is chosen uniformly at random, and d is determined by the measurement. The portion of the quantum circuit 500c in the dashed box creates an EPR-pair.

The quantum circuit 500c shown in FIG. 5C operates on inputs 501c and 502c and produces outputs 507c and 508c. In the example shown in FIG. 5C, the inputs 501c and 502c are the quantum states $|0\rangle$ and $|0\rangle$; and the outputs 507c and 508c are the quantum state $Z^d P^y|+\rangle$ and the classical bit d, respectively. The quantum circuit 500c may operate on other appropriate inputs and, accordingly, may produce other appropriate outputs.

The quantum circuit 500c includes two H-gates 512, a controlled-not gate 504, a $P^y$-gate 514, and a measurement gate 506. In some implementations, additional or different operations can be used to prepare a random qubit. Moreover, the quantum circuit 500c can be modified to perform the same or different computing tasks.

A correspondent may use any suitable technique (e.g., one-time pad, etc.) to encrypt a state. The encryption uses an encryption key that can be used to decrypt the encrypted state. The classical one-time pad is an encryption procedure that maps each bit j of a plaintext to j⊕r. A uniformly random key bit r (denoted as $r \in_R \{0, 1\}$) may be used. In such cases, because the ciphertext j⊕r is uniformly random (as long as r is unknown), the plaintext j is concealed. The quantum one-time pad is the quantum analog of the classical one-time pad. The encryption procedure for a single qubit may include uniformly randomly applying an operator in $\{I, X, Z, XZ\}$, or equivalently, applying $X^a Z^b$ for uniformly random bits a and b (here, I is the identity). This can map any single qubit to the maximally mixed state on one qubit, which we denote $\Pi_2$; thus the quantum plaintext can be concealed.

A quantum register can store a collection of qubits in a finite-dimensional Hilbert space, say $\mathcal{X}$. We denote $D(\mathcal{X})$ the set of density operators acting on $\mathcal{X}$. The set of all linear mappings from $\mathcal{X}$ to $\mathcal{Y}$ is denoted by $L(\mathcal{X}, \mathcal{Y})$, with $L(\mathcal{X})$ being a shorthand for $L(\mathcal{X}, \mathcal{X})$. A linear super-operator $\Phi: L(\mathcal{X}) \rightarrow L(\mathcal{Y})$ may be admissible if it is completely positive and trace-preserving. Admissible super-operators represent mappings from density operators to density operators, that is, they represent the most general quantum maps.

Given admissible super-operators $\Phi$ and $\Psi$ that agree on input space $L(\mathcal{X})$ and output space $L(\mathcal{Y})$, we are interested (for cryptographic purposes) in characterizing how "indistinguishable" these processes are. The diamond norm provides such a measure: given that $\Phi$ or $\Psi$ is applied with equal probability, the optimal procedure to determine the identity of the channel with only one use succeeds with probability ½+ $\|\Phi-\Psi\|_\diamond/4$. Here, we use the expression $$\|\Phi-\Psi\|_\diamond = \max\{\|(\Phi \otimes \Pi_\mathcal{W})(\rho) - (\Psi \otimes \Pi_\mathcal{W})(\rho)\|_1 : \rho \in D(\mathcal{X} \times \mathcal{W})\}, \quad (1)$$

where $\mathcal{W}$ is any space with dimension equal to that of $\mathcal{X}$ and $\Pi_\mathcal{W}$ is the identity in $L(\mathcal{W})$, and where the trace norm of an operator X can be defined $\|X\|_1 = \text{Tr}\sqrt{X^* X}$.

In some instances, a general quantum circuit can be decomposed into a sequence of the following elements: gates in $\{X, Z, H, P, \text{CNOT}, R\}$, auxiliary qubit preparation in $|0\rangle$ and single-qubit computational basis measurements. These operations can be executed, for example, by a server who has access only to the input in its encrypted form (e.g., where the encryption is the quantum one-time pad), and the output can be decrypted by the client. Moreover, this can be implemented without the server learning anything about the input or the encryption key. The protocols discussed here demonstrate techniques that may be used (e.g., by the server or by the server and client together) to execute the circuit elements. For each protocol, the client (who knows the encryption key for the input to the protocol) can compute a decryption key that, if applied to the output of the protocol, would result in the output of the circuit element applied to the unencrypted input. Other techniques may be used in some instances.

FIGS. 5D-5J show protocols for stabilizer circuit elements, while FIGS. 6A-6E show protocols for non-Clifford group gates, which use interaction. The explicit constructions are given for pure states, and the same constructions work on systems that are entangled.

Each of the protocols can be considered a gadget that implements a circuit element on an encrypted state, up to a known re-interpretation of the encryption key. To execute a larger target circuit, the circuit elements can be executed in sequence using these gadgets. The client may re-adjust her knowledge of the encryption keys on each relevant quantum wire after each gadget.

In some implementations, a protocol for quantum computing on encrypted data can proceed as follows. The client encrypts her register with the quantum one-time pad and sends the encrypted register to the server. The client and server perform the appropriate gadgets (e.g., those shown in the figures), according to the circuit that is to be executed, with the client re-adjusting the encryption keys on each relevant quantum wire after each gadget. The server returns the output register to the client, who decrypts it according to the key that she has computed.

In some instances, this example protocol may be implemented without any interaction other than the sending and receiving of the encrypted data. In some instances, a gadget is interactive (see, e.g., FIGS. 6A-6E), and the quantum part of this interaction is one-way (from the client to the server). The quantum interaction can be accomplished by the sending of a single auxiliary qubit (e.g., a qubit randomly selected from the set $$\left\{\frac{1}{2}(|0\rangle + |1\rangle), \frac{1}{\sqrt{2}}(|0\rangle + i|1\rangle), \frac{1}{\sqrt{2}}(|0\rangle - |1\rangle), \frac{1}{\sqrt{2}}((|0\rangle + i|1\rangle)\right\}.$$

In some cases, the auxiliary qubit can be sent, without loss of generality, at the beginning of the protocol. Thus, the protocol for quantum computing on encrypted data can be interactive. In some instances, the interactions can be completely classical, except for the initial sending of random, auxiliary single-qubit states, as well as for the sending of the input and output registers (if they are quantum). Furthermore, a target circuit that implements only Clifford group operations can be executed with no interaction (except for sending the input and output states).

Figure 5D:
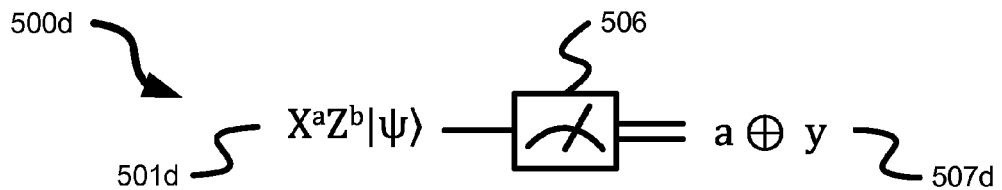

FIG. 5D shows an example of a quantum circuit 500d that can be used to measure a qubit in the computational basis. Here, y denotes the outcome of the measurement on the unencrypted qubit $|\psi\rangle$. The quantum circuit 500d operates on input 501d and produces output 507d. In the example shown in FIG. 5D, the input 501d is the quantum state $X^aZ^b|\psi\rangle$, and the output 507d is a⊕y. The quantum circuit 500d may operate on other appropriate inputs and, accordingly, may produce other appropriate outputs.

Using the protocol shown in FIG. 5D, a server can perform a measurement on an encrypted qubit. The quantum circuit 500d includes the measurement gate 506. The corresponding wire in FIG. 5D thus goes from a quantum wire (with encryption operation $X^aZ^b$) to a classical wire (with encryption key a). The client can take this measurement into account, for example, by updating the encryption key.

Figure 5E:
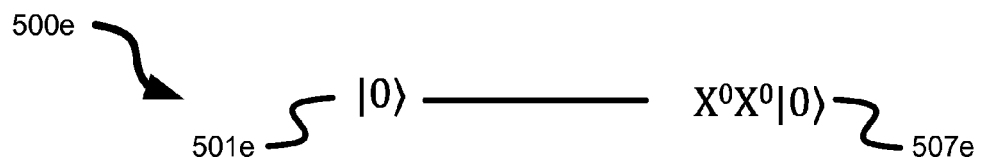

FIG. 5E shows an example of a quantum circuit 500e that can be used to prepare an auxiliary qubit. The quantum circuit 500e operates on input 501e and produces output 507e. In the example shown in FIG. 5E, the input 501e is the quantum state $|0\rangle$, and the output 507e is the quantum state $X^0X^0|0\rangle$. The quantum circuit 500e may operate on other appropriate inputs and, accordingly, may produce other appropriate outputs. The quantum circuit 500e performs an identity operation. In some implementations, additional or different operations can be used to prepare an auxiliary qubit. Using the protocol shown in FIG. 5E, a server may prepare an unencrypted auxiliary qubit in the $|0\rangle$ state and incorporate it into the computation. The client can set the encryption key for this qubit to be 0.

Figure 5F:
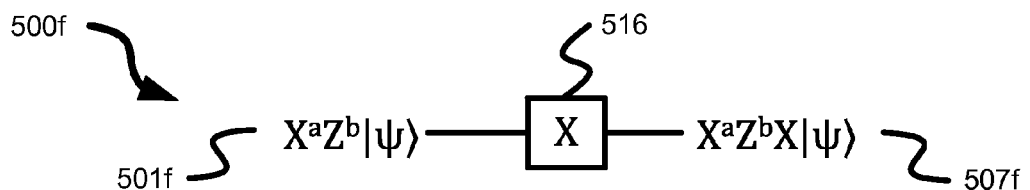

FIG. 5F shows an example of a quantum circuit 500f performing an X-gate 516. The quantum circuit 500f operates on input 501f and produces output 507f. In the example shown in FIG. 5F, the input 501f is the quantum state $X^aZ^b|\psi\rangle$, and the output 507f is the quantum state $X^aZ^bX|\psi\rangle$. The quantum circuit 500f may operate on other appropriate inputs and, accordingly, may produce other appropriate outputs. The X-gate 516 can be implemented by any suitable technique.

Figure 5G:
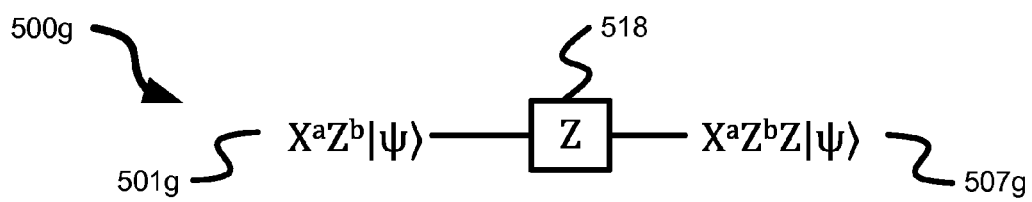

FIG. 5G shows an example of a quantum circuit 500g performing a Z-gate 518. The quantum circuit 500g operates on input 501g and produces output 507g. In the example shown in FIG. 5G, the input 501g is the quantum state $X^aZ^b|\psi\rangle$, and the output 507g is the quantum state $X^aZ^bZ|\psi\rangle$. The quantum circuit 500g may operate on other appropriate inputs and, accordingly, may produce other appropriate outputs. The Z-gate 518 can be implemented by any suitable technique.

Figure 5H:
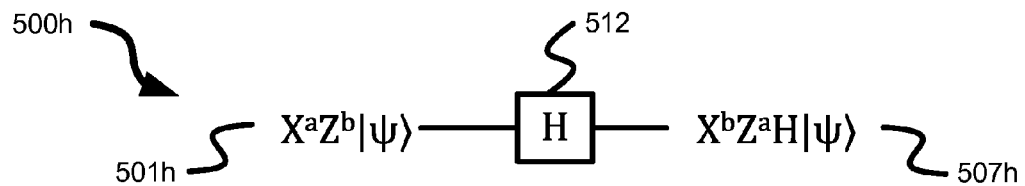

FIG. 5H shows an example of a quantum circuit 500h performing an H-gate 512. The quantum circuit 500h operates on input 501h and produces output 507h. In the example shown in FIG. 5H, the input 501h is the quantum state $X^aZ^b|\psi\rangle$, and the output 507h is the quantum state $X^bZ^aH|\psi\rangle$. The quantum circuit 500h may operate on other appropriate inputs and, accordingly, may produce other appropriate outputs. The H-gate 512 can be implemented by any suitable technique.

Figure 5I:
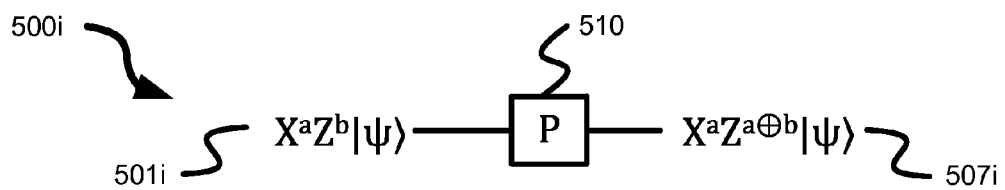

FIG. 5I shows an example of a quantum circuit 500i performing a P-gate 510. The quantum circuit 500i operates on input 501i and produces output 507i. In the example shown in FIG. 5I, the input 501i is the quantum state $X^aZ^b|\psi\rangle$, and the output 507i is the quantum state $X^bZ^{a\oplus b}|\rangle$. The quantum circuit 500i may operate on other appropriate inputs and, accordingly, may produce other appropriate outputs. The P-gate 510 can be implemented by any suitable technique.

Figure 5J:
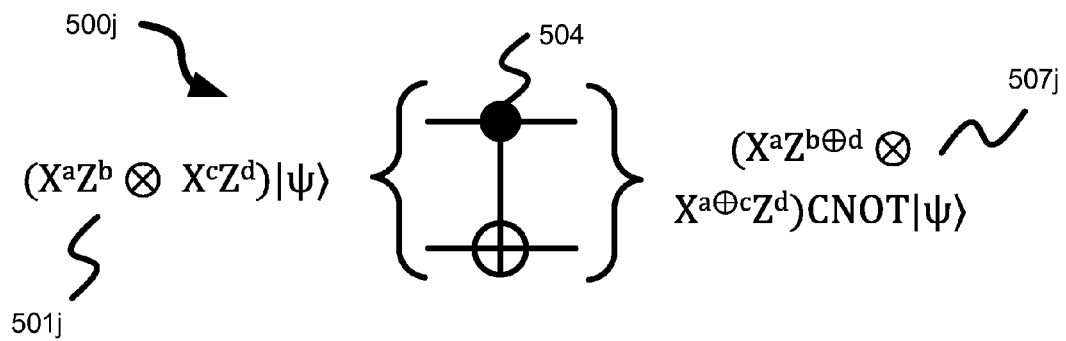

FIG. 5J shows an example of a quantum circuit 500j performing a controlled-not gate 504 on two qubits represented by the unencrypted state $|\psi\rangle$. The quantum circuit 500i operates on input 501j and produces output 507j. In the example shown in FIG. 5J, the input 501j is the encrypted quantum state $X^aZ^b\hat{x}X^cZ^d|\psi\rangle$, and the output 507j is the encrypted quantum state $X^aZ^{b\oplus d}\hat{x}X^{a\oplus c}Z^d\text{CNOT}|\psi\rangle$. The quantum circuit 500j may operate on other appropriate inputs and, accordingly, may produce other appropriate outputs. The controlled-not gate 504 can be implemented by any suitable technique.

The relationships between the Pauli matrices and Clifford group operations is the basis for the protocols given in FIGS. 5F-5J. Since the X and Z gates commute or anti-commute (and since we can safely ignore a global phase), FIGS. 5F and 5G can be seen as implementing a protocol for the X and Z-gates. Similarly, the relation HX=ZH is sufficient to show the H-gate protocol given in FIG. 5H, and the fact that PZ=ZP and PX=−iZXP show the P-gate protocol given in FIG. 5I. Finally, the protocol for the CNOT-gate as given in FIG. 5J can be verified in a similar way.

A set of gates for universal quantum computing can be constructed based on any suitable set of operators. For example, universality may be achieved by combining a subset (e.g., less than all) of the protocols given here. As a specific example, universality can be achieved by combining a protocol for the R-gate (e.g., in FIG. 6A or 6B, etc.) with the protocols for the controlled-not gate and the H-gate. This can be seen since P=R², Z=P² and X=HZH. Each of these decompositions includes at least two R-gates. The protocol for an R-gate uses an auxiliary qubit and classical interaction. In some instances, it can thus be preferable to decompose a circuit into the redundant gate set that we have used as this may reduce the cost of gates. Also, by giving explicit protocols for all of these circuit elements, we have established that a stabilizer circuit can be performed on encrypted data without requiring any interaction, except for the exchanging of the encrypted data register.

Given the protocols shown in FIGS. 5D-5J, the only remaining gate needed to implement universal quantum computation is a non-Clifford group gate. The R-gate is an example non-Clifford group gate.

Figure 5K:
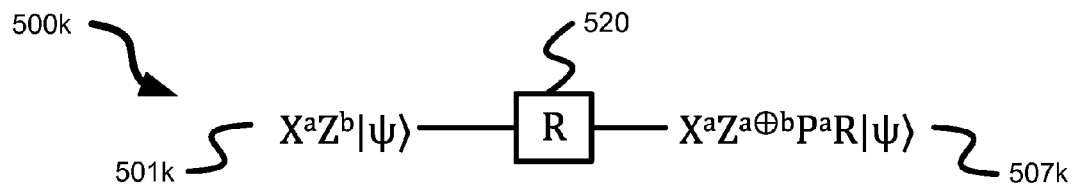

FIG. 5K shows an example of a quantum circuit 500k performing an R-gate 520. The quantum circuit 500k operates on input 501k and produces output 507k. In the example shown in FIG. 5K, the input 501k is the quantum state $X^aZ^b|\psi\rangle$, and the output 507k is the quantum state $X^aZ^{a+b}P^aR|\psi\rangle$. The quantum circuit 500k may operate on other appropriate inputs and, accordingly, may produce other appropriate outputs. The R-gate 520 can be implemented by any suitable technique.

As shown in FIG. 5K, the server applies the R-gate to the encrypted data. However, this does not immediately work, since RX=XZPR and so in the case that an X-encryption is present, the output picks up a P gate (which cannot be corrected by applying Pauli corrections).

In some implementations, the R-gate may instead by performed based on a classical interaction and a single forward auxiliary qubit randomly chosen out of a discrete number (e.g., four or another number) of possibilities. This may reduce the resource needed to perform a non-Clifford group gate in some instances. For example, performing a hidden P-gate may require less resources than performing a hidden R-gate.

FIGS. 6A-6E are schematic diagrams showing example quantum circuits. Each of the example quantum circuits (600a, 600b, 600c, 600d, 600e) shown in FIGS. 6A-6E include operations performed by multiple entities. The quantum circuits are provided to illustrate operations that can be used by multiple entities to perform specified computing tasks (such as, for example, an R-gate or another non-Clifford group gate). In some cases, the quantum circuits can be modified, for example, where such modification is appropriate for a particular implementation, architecture, or computing environment.

The example quantum circuits shown in FIGS. 6A-6E can be performed by any suitable hardware, software, or combination thereof. The quantum circuits are represented as combinations of single-qubit gates acting on individual qubits and two-qubit gates acting on pairs of qubits. In some implementations, the computing tasks can be performed using additional, fewer, or different operations, which may include other quantum gates. In some implementations, multiple gates can be combined and performed as a single gate, or a single gate can be decomposed and performed as multiple gates. Moreover, the quantum gates, and any other operations, can be performed in the order shown or in another suitable order.

The example quantum circuits shown in FIGS. 6A-6E are represented as operations performed by two entities. In some implementations, the computing tasks can be performed by additional, fewer, or different entities. In some implementations, computing tasks can be delegated to other entities, performed in advance, or handled in another manner. Moreover, the entities can communicate information using any suitable techniques, and the information may be communicated in the order shown or in another suitable order.

The example quantum circuits shown in FIGS. 6A-6E each include a first entity (640a, 640b, 640c, 640d, 640e) and a second entity (650a, 650b, 650c, 650d, 650e). In four of the figures (FIGS. 6A, 6B, 6D, and 6E), the first entity provides a control message and an auxiliary qubit to the second entity; and the second entity performs a sequence of operations using the control message and the auxiliary qubit as inputs. In each of these four quantum circuits (600a, 600b, 600d, 600e), the auxiliary qubit provided by the first entity is one of a discrete number of specified quantum states that can be accepted as input by the sequence of operations performed by the second entity. Also, in these four examples (600a, 600b, 600d, 600e), the sequence of operations by the second entity includes at least one unitary operation parameterized by the control message. The sequence of operations may be performed, for example, on an encrypted state provided by the first entity. In such instances, a measurement operation (e.g., the measurement gate 506) produces encryption-key-update information for the first entity.

FIG. 6A shows an example of a quantum circuit 600a that can be used to perform an R-gate. The quantum circuit 600a includes operations performed by a first entity 640a and a second entity 650a. The quantum circuit 600a operates on inputs 601a, 602a, and 603a, and produces outputs 607a and 608a. The quantum circuit 600a may operate on other appropriate inputs and, accordingly, may produce other appropriate outputs.

In the example shown in FIG. 6A, the input 601a is the quantum state $X^a Z^b |\psi\rangle$, the input 602a is a classical bit x=a⊕y, and the input 603a is a quantum state $|+\rangle$. The input 601a can be an encrypted state encrypted by the first entity 640a using an encryption key and then sent from the first entity 640a to the second entity 650a. For example, $X^a Z^b |\psi\rangle$ can represent the encrypted state produced from the unencrypted state $|\psi\rangle$ and the encryption key {a, b}. The input 602a can be a control message that parameterizes a unitary operation performed by the second entity 650a. As shown in FIG. 6A, the input 602a parameterizes the $P^x$-gate 615 performed by the second entity 650a. The input 603a can be an auxiliary qubit that is converted to one of four specified quantum states. As shown in FIG. 6A, the input 603a is converted to a quantum state that is used by the second entity 650a to produce the output 607a.

In the example shown in FIG. 6A, the output 607a is the quantum state $X^{a \oplus c} Z^{a(c \oplus y \oplus 1) \oplus b \oplus d \oplus y} R |\psi\rangle$, and the output 608a is the classical bit c. The output 607a can be an encrypted output state, which can be sent from the second entity 650a to the first entity 640a. The output 608a can be the encryption-key-update information for the first entity 640a.

In some implementations, applying the circuit 600a to a quantum register converts a register qubit from the state $X^a Z^b |\psi\rangle$ to the state $X^{a \oplus c} Z^{a(c \oplus y \oplus 1) \oplus b \oplus d \oplus y} R |\psi\rangle$. As such, the quantum circuit 600a can manipulate the register by converting the register qubit from the input 601a to the output 607a. In such instances, the mapping from the input 601a to the output 607a, and therefore the overall effect of the quantum circuit 600a on the register, can be represented as a unitary operation.

The first entity 640a can receive one or both of the outputs 607a and 608a. In some cases, the first entity 640a receives the output 608a and updates the encryption key. In the example shown in FIG. 6A, the encryption key {a, b} can be updated to {a⊕c, a(c⊕y⊕1)⊕b⊕d⊕y}. In some cases, the first entity 640a receives both outputs and uses them to produce a decrypted output state. For example, the first entity 640a can use the output 608a to update the encryption key, and the first entity 640a can use the updated encryption key to decrypt the output 607a. For the example shown in FIG. 6A, the decrypted output state can be $R|\psi\rangle$, which represents the result of applying an R-gate to an unencrypted input state $|\psi\rangle$.

The quantum circuit 600a includes the following operations performed by the first entity 640a: a $P^y$-gate 514 and a $Z^d$-gate 618. The quantum circuit 600a includes the following operations performed by the second entity 650a: an R-gate 520, a controlled-not gate 504, a measurement gate 506, and a $P^x$-gate 615. The operations may be performed at any suitable time and in any suitable order. The $P^x$ gate is represented $P^x: |j\rangle \mapsto (i)^{j \cdot x} |j\rangle$. As such, the $P^x$ gate applies the phase gate (P) when x=1, and the $P^x$ gate applies the identity otherwise (when x≠1). The $Z^d$ gate is represented $Z^d: |j\rangle \mapsto (-1)^{j} |j\rangle$. As such, the $Z^d$ gate applies the Z gate when d=1, and the $Z^d$ gate applies the identity otherwise (when d≠1).

The quantum circuit 600a also includes interactions between the first entity 640a and the second entity 650a. In the example, shown in FIG. 6A, the first entity 640a sends the second entity 650a the inputs 602a and 603a, and the second entity 650a sends the first entity 640a the output 608a. The interactions may occur in any suitable order. For example, the first entity 640a can send the control message (x), the auxiliary qubit $Z^d P^y |+\rangle$, and any other suitable information to the second entity 650a at any appropriate time and in any appropriate order, and the second entity 650a can send the encryption-key-update information (c) and any other suitable information to the second entity 650a at any appropriate time and in any appropriate order.

In an example aspect of operation, the first entity 640a obtains two randomly-selected bits y and d. The bits y and d may be generated, for example, by a random number generator or another type of device. The first entity 640a obtains the input 602a by computing x=a⊕y, and sends the input 602a to the second entity 650a. The first entity 640a applies the operations shown in FIG. 6A to the input 603a, and sends the resulting quantum state $Z^d P^y |+\rangle$ to the second entity 650a.

The second entity 650a uses the information from the first entity 640a and the input 601a as inputs for the sequence of operations shown in FIG. 6A. The measurement gate 506 produces the output 608a, and the P-gate 615 produces the output 607a. The second entity 650a sends the first entity 640a one or both of the outputs 607a, 608a.

FIG. 6C shows an example of a quantum circuit 600c that can be used to encrypt and send a qubit using teleportation. The quantum circuit 600c includes operations performed by a first entity 640c and a second entity 650c. The quantum circuit 600c operates on inputs 601c, 602c, and 603c, and produces outputs 607c, 608c, and 609c. The quantum circuit 600c may operate on other appropriate inputs and, accordingly, may produce other appropriate outputs.

In the example shown in FIG. 6C, the inputs 601c and 602c are both the quantum state $|0\rangle$, and the input 603c is the quantum state $|\psi\rangle$; the output 607c is the quantum state $X^a Z^b |\psi\rangle$, and the outputs 608c and 609c are the classical bits a and b, respectively. The quantum state $|\psi\rangle$ may represent the unencrypted input state, and the quantum state $X^a Z^b |\psi\rangle$ may represent the encrypted quantum state.

The quantum circuit 600c includes the following operations performed by the first entity 640c: two controlled-not gates 504, two measurement gates 506, and two H-gates 512. The operations may be performed at any suitable time and in any suitable order.

The quantum circuit 600c also includes interactions between the first entity 640c and the second entity 650c. In the example, shown in FIG. 6C, the first entity 640c sends the second entity 650c the output 607c.

In an example aspect of operation, the first entity 640c uses the quantum circuit 600c to send an encrypted version of the input state $|\psi\rangle$ to the second entity 650c. The second entity 650c obtains the encrypted input state $X^a Z^b |\psi\rangle$, and the first entity obtains the encryption key. In this example, the bits (a and b) produced by the measurement gates 506 are the encryption key.

Figure 6D:
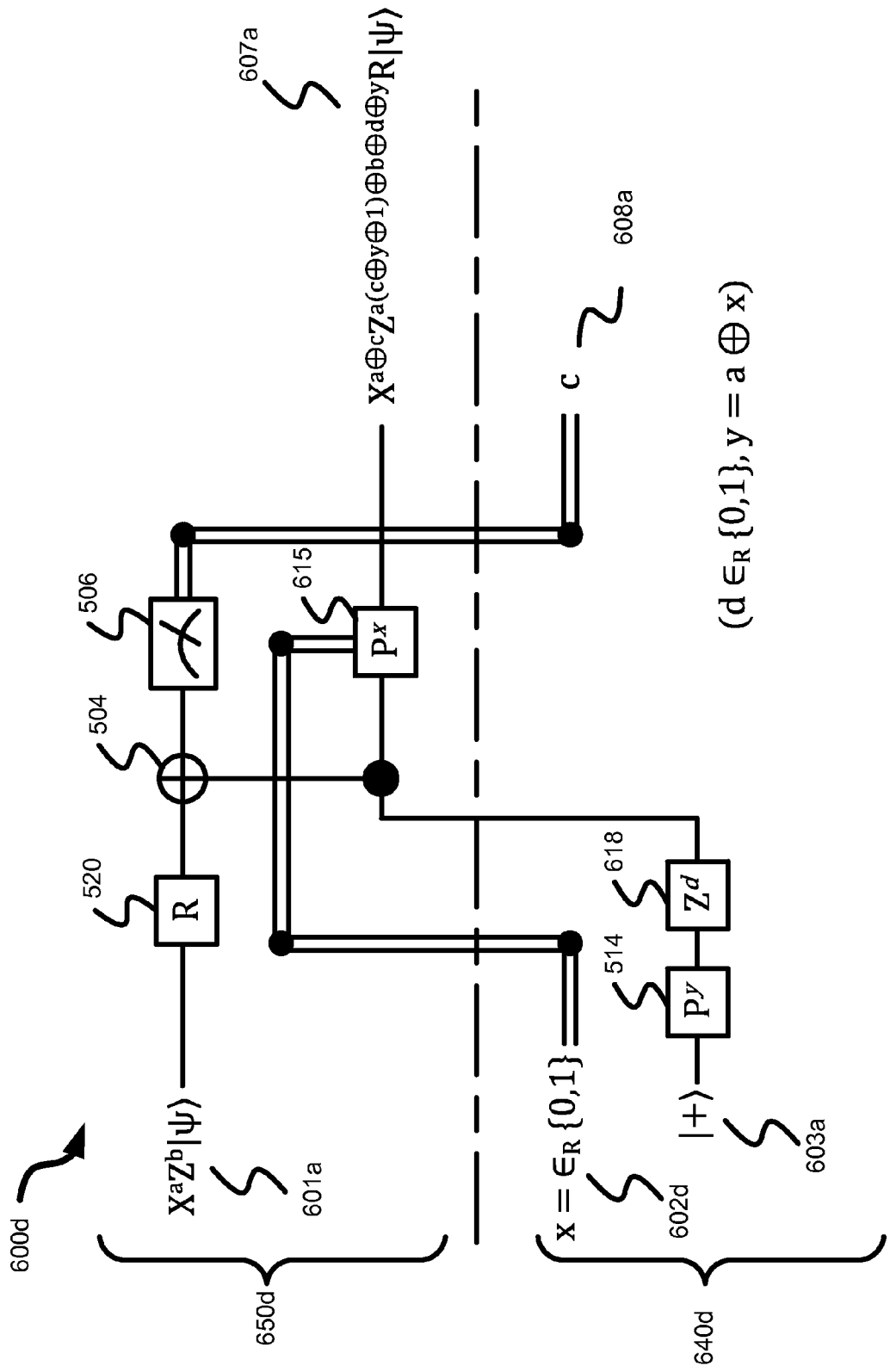

FIG. 6D shows another example of a quantum circuit 600d that can be used to perform an R-gate. The quantum circuit 600d shown in FIG. 6D is similar to the quantum circuit 600a shown in FIG. 6A. In the quantum circuit 600d shown in FIG. 6D, the classical message (x) from the client to the server is chosen uniformly at random, and y is computed as y=a⊕x.

Figure 6E:
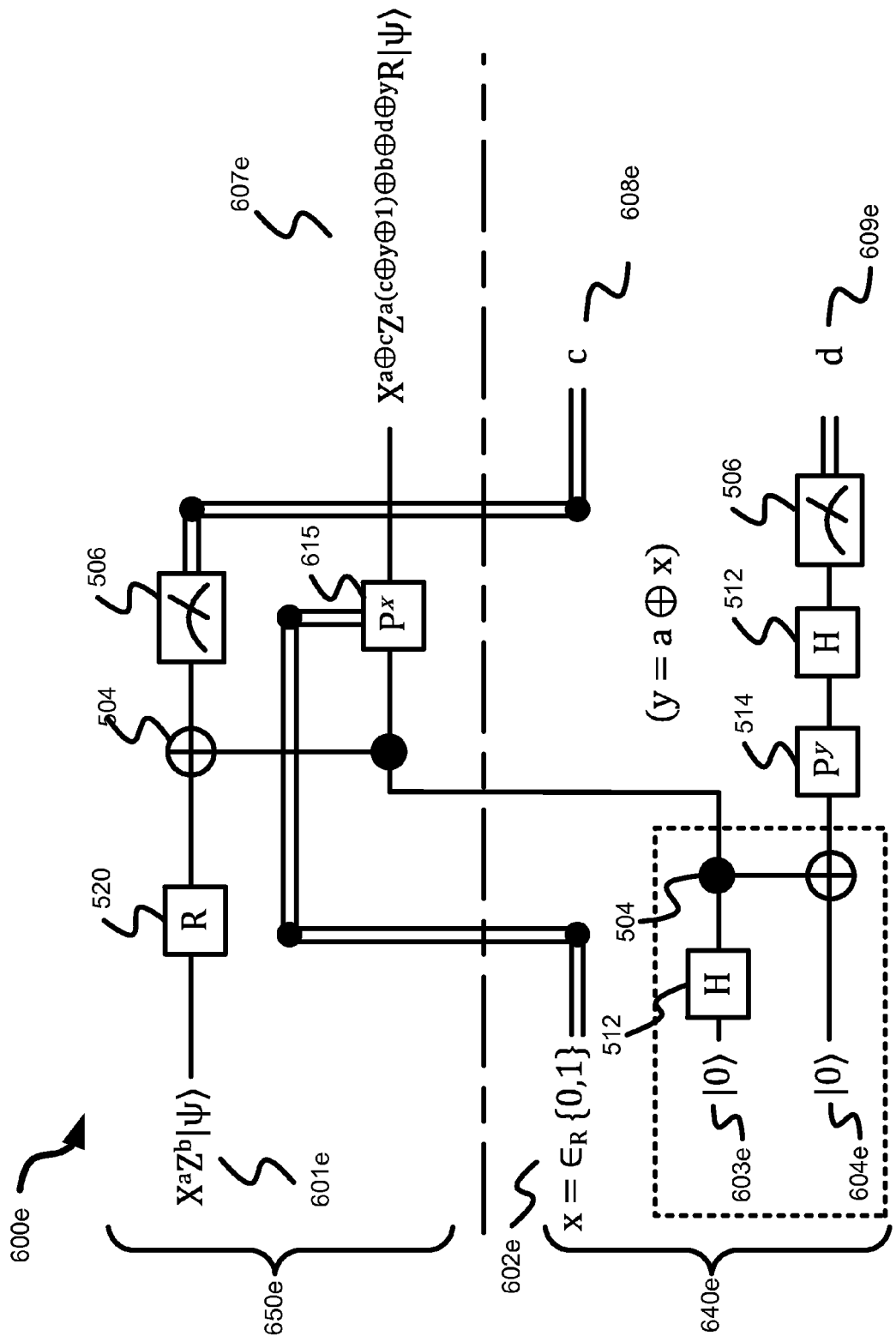

FIG. 6E shows another example of a quantum circuit 600e that can be used to perform an R-gate. The quantum circuit 600e shown in FIG. 6E is similar to the quantum circuit 600a shown in FIG. 6A and the quantum circuit 600d shown in FIG. 6D. The quantum circuit 600e shows an example of an entanglement-based technique for perform in an R-gate. Here, the portion of the quantum circuit 600c in the dashed box prepares an EPR-pair.

As shown in FIG. 6E, the first entity 640e creates an EPR-pair from the inputs 603e and 604e. In this example, the inputs 603e and 604e are both the quantum state $|0\rangle$. The first entity 640e creates the EPR-pair by applying the H-gate 512, controlled-not gate 504 sequence. Then, one qubit of the EPR-pair is provided to the second entity 650e, and the second entity 650e uses the qubit as an auxiliary qubit. The other qubit of the EPR-pair is retained by the first entity 640e and measured (after application of the gates shown) to obtain the output 609e. The first entity 640e may use the measured output 609e and the received output 608e to generate or update an encryption key.

As such, the circuits discussed above may be used by a server for implementing universal quantum computing on encrypted data. After each gadget, the client adapts her knowledge of the encryption key according to the relevant figures. Each gadget itself is correct, so the entire protocol implements the quantum circuit as desired.

The protocols described above can provide the same level of security as the one-time pad, which can be perfect (information-theoretic) privacy. The definition of privacy can be formalized based on simulations, and proof may be given using an entanglement-based protocol.

The following discussion provides a proof of security for the example protocol represented by FIG. 6A. A protocol for delegated computation can be specified by a pair (C,S) representing an honest client and an honest server (here, both parties may be considered quantum). For an honest client, the security property concerns interactions between pairs (C,S') where S'deviates arbitrarily from S. At the onset of the protocol, both parties agree on the classical input q which determines the general quantum circuit to be executed as an ordered series of gates acting on specified wires. The structure of the interaction between C and S can thus be determined by q. At the same time, a quantum input $\rho_{in} \in D(C \otimes S)$ is distributed, C receiving the register in $C$ and S receiving the register in $S$. A cheating server S' is any quantum computational process that interacts with C according to the message structure determined by q. By allowing S' access to the input register $S$, we explicitly allow S' to share prior entanglement with C's input; this also models any prior knowledge of S' and formalizes the notion that the protocol cannot be used to increase knowledge.

Let Z denote the output space of S' and let $\Phi_q: L(S) \to L(Z)$ be the mapping induced by the interaction of S' with C. Here, security may be defined in terms of the existence of a simulator $S_{S'}$ for a given server S', which is a general quantum circuit that agrees with S' on the input and output dimensions. Such a simulator does not interact with C, but induces a mapping $\Psi_q: L(S) \to L(Z)$ on each input q. Informally, (C,S) is private if the two mappings, $\Phi_q$ and $\Psi_q$ are indistinguishable for every choice of q and every choice of $\rho_{in}$. Allowing for an ϵ amount of leakage, we formalize this as follows. A protocol (C, S) for a delegated quantum computation is ϵ-private if for every server S' there exists a simulator $S_{S'}$ such that for every classical input q, $\|\Phi_q - \Psi_q\|_\diamond \leq \epsilon$, where $\Phi_q$ is the mapping induced by the interaction of S' with the client C on input q and $\Psi_q$ is the mapping induced by $S_{S'}$ on input q. Taking ϵ=0 gives the strongest possible security against a malicious server: it does not allow for even an ϵ amount of leakage, and allows the server to deviate arbitrarily (without imposing any computational bounds). This level of privacy can, in some instances, be achieved by the protocols discussed here.

The following discussion provides a proof that the protocols discussed here can be used to provide ϵ-private delegated quantum computation, with ϵ=0. Fix a value for q, and construct a simulator $S_{S'}$ by giving instructions how to prepare messages that replace the messages that the client C would send to the server S' in the protocol. Privacy follows since we will show that these transmissions are identical to those in the real protocol.

A high-level sketch of the proof is that we modify the behavior of the client in the protocol represented by FIG. 6A in a way that the effect of the protocol is unchanged, yet the client delays introducing her input into the protocol until after her interaction with the server has ended. In order to do so, we describe below an entanglement-based protocol as well as a delayed-measurement protocol.

We first consider the entanglement-based protocol (e.g., FIG. 6E). In the example entanglement-based protocol, we modify how the client prepares her messages, without modifying the server's actions or the effect of the protocol. Thus, the preparing and sending of an encrypted quantum register can be replaced by an equivalent teleportation-based protocol, as given in FIG. 6C. Also, the R-gate protocol is replaced by an equivalent protocol as given in FIG. 6E. The protocol represented in FIG. 6E can be seen to be correct via an intermediate protocol (FIG. 6D), in which the classical bit x from the client to the server becomes a uniformly random bit; this transformation is possible because in the protocol of FIG. 6A, x=a⊕y, where y is a random bit. Then choosing x to be random and y=a⊕x gives an equivalent protocol. The entanglement-based protocol (e.g., as represented by FIG. 6E) is seen to be correct via the circuit identity given in FIG. 5C. The remaining protocols for stabilizer circuit elements are non-interactive and thus unchanged in the entanglement-based protocol.

The entanglement-based protocol may provide advantages in some instances. For example, the client's measurements (e.g., in FIGS. 6C and 6E) can be delayed until the output register is returned to the client, without affecting the computation or the server's view of the protocol (because actions on different subsystems commute). The result can be considered a delayed-measurement protocol. Here, the messages from the client to the server can be chosen before any interaction with the server, and they are independent of the actions of S'.

Thus, a simulator $S_{S'}$ can play the role of the client in the delayed-measurement protocol, but that does not perform measurements (thus, access to the actual input is not required). By the argument above, $S_{S'}$ prepares the same transmissions as would C in the main protocol interacting with S' on any input $\rho_{in}$. It follows that simulating S' on these transmissions will induce the same mapping as S' in the main protocol, and thus $\|\Phi_q - \Psi_q\|_\diamond = 0$.

In some contexts, a malicious server may not necessarily follow the protocol, thus possibly interfering with the computation. A cheating server can be detected, for example, using a quantum authentication code. The privacy definition and the proof given above can hold against such a malicious server.

FIG. 6B shows another example of a quantum circuit 600b that can be used to perform a Z (π/4)-gate. The quantum circuit 600b includes operations performed by a first entity 640b (represented schematically outside of the dashed line) and a second entity 650b (represented schematically inside the dashed line). The quantum circuit 600b operates on inputs 601b, 602b, and 603b, and produces outputs 607b and 608b. The quantum circuit 600b may operate on other appropriate inputs and, accordingly, may produce other appropriate outputs.

In the example shown in FIG. 6B, the input 601b is the quantum state $X^a Z^b |\psi\rangle$, the input 602b is a classical bit $\delta = (-1)^c a\pi/2 - \theta + \pi r \mod 2\pi$, and the input 603b is a quantum state $|+\theta\rangle$. The input 601b can be an encrypted input state encrypted by the first entity 640b using an encryption key and then sent from the first entity 640a to the second entity 650a. For example, $X^a Z^b |\psi\rangle$ can represent the encrypted state produced from the unencrypted state $|\psi\rangle$ and the encryption key {a, b}. The input 602b can be a control message that parameterizes a unitary operation performed by the second entity 650b. As shown in FIG. 6B, the input 602b parameterizes the Z(δ)-gate 624 performed by the second entity 650b. The input 603b can be an auxiliary qubit having one of four specified quantum states. As shown in FIG. 6B, the input 603b is a quantum state that is used by the second entity 650b to produce the output 608b.

In the example shown in FIG. 6B, the output 608b is the quantum state $X^{a \oplus c} Z^{b \oplus r} Z(\pi/4)|\psi\rangle$, and the output 607b is the classical bit c. The output 608b can be an encrypted output state, which can be sent from the second entity 650b to the first entity 640b. The output 607b can be the encryption-key-update information for the first entity 640b.

In some implementations, applying the circuit 600b to a quantum register converts a register qubit from the state $X^a Z^b |\psi\rangle$ to the state $X^{a \oplus c} Z^{b \oplus r} Z(\pi/4)|\psi\rangle$. As such, the circuit 600b can manipulate the register by converting the register qubit from the input 601b to the output 608b. In such instances, the mapping from the input 601a to the output 608b, and therefore the overall effect of the circuit 600b on the register, can be represented as a unitary operation.

The first entity 640b can receive one or both of the outputs 607b and 608b. In some cases, the first entity 640b receives the output 607b and updates the encryption key. In the example shown in FIG. 6B, the encryption key {a, b} can be updated to {a⊕c, b⊕r}. In some cases, the first entity 640b receives both outputs and uses them to produce a decrypted output state. For example, the first entity 640b can use the output 607b to update the encryption key, and the first entity 640b can use the updated encryption key to decrypt the output 608b. For the example shown in FIG. 6B, the decrypted output state can be $|\psi\rangle$, which represents the result of applying a Z(π/4)-gate to an unencrypted input state $|\psi\rangle$.

The first entity 640b can receive the outputs 607b and 608b and use them to produce a decrypted output state. For example, the first entity 640b can use the output 607b to update an encryption key, and the first entity 640b can use the updated encryption key to decrypt the output 607b. For the example shown in FIG. 6B, the decrypted output can represent the result of applying an R-gate to an unencrypted input state $|\psi\rangle$.

The quantum circuit 600b includes the following operations performed by the second entity 650b: the Z(π/4)-gate 622, a controlled-not gate 504, a measurement gate 506, and a Z(δ)-gate 624. The operations may be performed at any suitable time and in any suitable order. Here, $Z(\delta) = e^{-i\delta Z/2}$. Thus, Z(π/4) is equivalent to the R-gate (up to a global phase that can be disregarded).

The quantum circuit 600b also includes interactions between the first entity 640b and the second entity 650b. In the example, shown in FIG. 6B, the first entity 640b sends the second entity 650b the inputs 602b and 603b, and the second entity 650b sends the first entity 640b the outputs 607b and 608b. The interactions may occur in any suitable order. For example, the first entity 640b can send the control message (δ), the auxiliary qubit $|+_\theta\rangle$, and any other suitable information to the second entity 650b at any appropriate time and in any appropriate order, and the second entity 650b can send the encryption-key-update information (c) and any other suitable information to the second entity 650b at any appropriate time and in any appropriate order.

In an example aspect of operation, the first entity 640b selects a value θ uniformly at random from {0, π/2, π, 3π/2}, prepares the auxiliary qubit $|+_\theta\rangle$, and sends the auxiliary qubit to the second entity 650b. The second entity 650b uses the auxiliary qubit from the first entity 640b and the input 601b as inputs for the sequence of operations shown in FIG. 6B. The measurement gate 506 produces the output 607b, and the second entity 650b sends the output 607b to the first entity 640b. The first entity 640b calculates $\delta = (-1)^c a\pi/2 - \theta + \pi r \mod 2\pi$ and sends the calculated value δ to the second entity 650b. The second entity 650b applies the Z(δ)-gate 624, which produces the output 608b.

The following discussion provides a proof that the protocol represented in FIG. 6B can be used to provide E-private delegated quantum computation, with ε=0. First, let $\Phi_x$ be the mapping induced by the interaction of S' with C. Security can be defined in terms of the existence of a simulator $\mathcal{S}_{S'}$ for a given server S', which is a general quantum circuit that agrees with S' on the input and output dimensions. Such a simulator does not interact with C, but simply induces a mapping $\Psi_x$ on each input x. The protocol (C, S) may be considered secure if the two mappings, $\Phi_x$ and $\psi_x$ are indistinguishable for every choice of x and every choice of $\rho_{in}$.

In some implementations, a protocol (C, S) for a delegated quantum computation is c-secure if, for every server S' there exists a simulator $\mathcal{S}_{S'}$ such that, for $\Phi_x$ the mapping induced by the interaction of S' with C on input x and $\Psi_x$ the mapping induced by $\mathcal{S}_{S'}$ on x, $\|\Phi_x-\Psi_x\|_{\blacklozenge} \leq \epsilon$, for all inputs x.

Security can be proven by induction on g, the number of gates for the circuit represented by x, where the circuit has a fixed number of input wires. If g=0, then for each input qubit to the circuit, the simulator $\mathcal{S}_{S'}$ prepares $\mathrm{II}_2$. He uses this as the message from C to S'. This transmission prepared by $\mathcal{S}_{S'}$ is the same state as when S' interacts with C on any input for C. It follows that $\|\Phi_x-\Psi_x\|_{\blacklozenge}=0$.

Suppose the result is true for a number g=k of gates and consider a number g=k+1 of gates. Let the last gate according to x be G, and let x' be the result of removing gate G from x. Let $S'_k$ be S', restricted to the first k gates. Let $\mathcal{S}_k$ be the simulator for $S'_k$ ($\mathcal{S}_k$ exists by induction). Then $\mathcal{S}_{S'}=\mathcal{S}_{k+1}$ is constructed by first executing $\mathcal{S}_k$ and then simulating S's action during and after the protocol for gate G. If there is no transmission from C to S' in this step, then we are done. Otherwise, gate G is an R-gate. In this case, $\mathcal{S}_{k+1}$ prepares an auxiliary qubit in $\mathrm{II}_2$ and sends it to S'. It also prepares a uniformly random angle $\delta \in \{0, \pi/2, \pi, 3\pi/2\}$ and sends it to S'. Consider the transmissions prepared by C in an R-gate protocol when interacting with S' upon any input state $\rho_{in}$: they include an auxiliary qubit and a value $\delta$, which we can represent as a two-qubit quantum state $|\delta\rangle$ (taking $\delta$ as a two-bit string). Let $\phi(-1)^c a\pi/2$. Thus, for $\theta \in \{0, \pi/2, \pi, -\pi/2\}$ and $r \in \{0, 1\}$, the system received by S' is $$\sum_\theta \sum_r |+_\theta\rangle |\phi-\theta+r\pi\rangle = \sum_\theta |+_\theta\rangle (|\phi-\theta\rangle + |\phi-\theta+\pi\rangle) +=$$

$$|+\rangle(|\phi\rangle + |\phi+\pi\rangle) + |+_{\frac{\pi}{2}}\rangle(|\phi-\frac{\pi}{2}\rangle + |\phi+\frac{\pi}{2}\rangle) +$$

$$|-\rangle(|\phi+\pi\rangle + |\phi\rangle)|-_{\frac{\pi}{2}}\rangle(|\phi+\frac{\pi}{2}\rangle + |\phi-\frac{\pi}{2}\rangle) =$$

$$(|+\rangle + |-\rangle) \otimes (|\phi\rangle + |\phi+\pi\rangle) + |+_{\frac{\pi}{2}}\rangle + |-_{\frac{\pi}{2}}\rangle) \otimes (|\phi-\frac{\pi}{2}\rangle + |\phi+\frac{\pi}{2}\rangle) =$$

$$\mathbb{I}_2 \otimes (|\phi\rangle + |\phi+\frac{\pi}{2}\rangle + |\phi+\pi\rangle + |\phi-\frac{\pi}{2}\rangle) = \mathbb{I}_2 \otimes \mathbb{I}_4$$

Thus the transmission prepared by $\mathcal{S}_{k+1}$ is in the same state as when C interacts with S' upon any input state $\rho_{in}$. It follows that simulating S' on this final gate will yield $\|\Phi_x-\Psi_x\|_{\in}=0$.

While this specification contains many details, these should not be construed as limitations on the scope of the claims or of what may be claimed, but rather as descriptions of features of particular implementations. Certain features that are described in this specification in the context of separate embodiments can also be implemented in combination in a single embodiment. Moreover, various features that are described in the context of a single embodiment can be implemented in multiple embodiments separately or in any suitable sub-combination.

Thus, a number of embodiments have been described. Nevertheless, it will be understood that various modifications may be made. Accordingly, other embodiments are within the scope of the following claims.

What is claimed is:

1. A quantum computing method comprising:
   receiving an encrypted state from a correspondent;
   receiving a control message from the correspondent;
   storing the encrypted state in a quantum register;
   applying a quantum circuit to the encrypted state to produce an encrypted output state, the quantum circuit comprising a sequence of operations that manipulates the quantum register, wherein the sequence of operations includes:
      a unitary operation parameterized by a control message from the correspondent; and
      an operation that produces encryption-key-update information;
   wherein the sequence of operations uses an auxiliary quantum state as input, the auxiliary quantum state includes an auxiliary qubit, the quantum register includes a register qubit, and applying the sequence of operations includes:
      applying a first gate to the auxiliary qubit and the register qubit;
      after applying the first gate:
         measuring the register qubit to obtain the encryption-key-update information; and
         applying a second gate to the auxiliary qubit, wherein the second gate is parameterized by the control message;
   sending the encrypted output state to the correspondent; and
   sending the encryption-key-update information to the correspondent.

2. The method of claim 1, wherein the encryption-key-update information is sent to the correspondent during application of the sequence of operations, and the control message is received from the correspondent in response to the encryption-key-update information.

3. The method of claim 1, wherein the encryption-key-update information is sent to the correspondent during application of the sequence of operations, and the control message is received from the correspondent independent of the encryption-key-update information.

4. The method of claim 1, wherein the control message is received from the correspondent before application of the sequence of operations, and the encryption-key-update information is sent to the correspondent after application of the sequence of operations.

5. The method of claim 1, wherein before applying the sequence of operations, the auxiliary qubit comprises one of four specified quantum states acceptable by the sequence of operations.

6. The method of claim 1, wherein the auxiliary quantum state is provided by the correspondent.

7. The method of claim 1, wherein applying the sequence of operations executes a non-Clifford group quantum gate.

8. A quantum computing system comprising:
   an interface operable to:
      receive an encrypted state and a control message from a computing device; and
      send an encrypted output state and encryption-key-update information to the computing device;
   a quantum register operable to store the encrypted state; and
   quantum logic operable to apply a quantum circuit to the encrypted state to produce the encrypted output state, the quantum circuit comprising a sequence of operations that manipulates the quantum register, wherein the sequence of operations includes:

29 a unitary operation parameterized by a control message from the computing device; and
an operation that produces the encryption-key-update information
wherein the sequence of operations uses an auxiliary quantum state as input, the auxiliary quantum state includes an auxiliary qubit, the quantum register includes a register qubit, and applying the sequence of operations includes:
applying a first gate to the auxiliary qubit and the register qubit;
after applying the first gate:
measuring the register qubit to obtain the encryption-key-update information; and
applying a second gate to the auxiliary qubit, wherein the second gate is parameterized by the control message.

9. The quantum computing system of claim 8, wherein the computing device is communicably coupled to the interface by at least one of a direct communication link or a communication network.

10. The quantum computing system of claim 8, wherein the computing device is communicably coupled to the interface by at least one of a classical channel or a quantum channel.

11. The quantum computing system of claim 8, wherein the computing device comprises a first computing device, the quantum computing system comprises a second computing device that includes the interface, the quantum register, and the quantum logic, and the first computing device and the second computing device are configured to communicate as peers.

12. The quantum computing system of claim 8, wherein the computing device comprises a first computing device, the quantum computing system comprises a second computing device that includes the interface, the quantum register, and the quantum logic, and the first computing device and the second computing device are configured to communicate as client and server, respectively.

13. The quantum computing system of claim 8, further comprising the computing device, wherein the computing device is operable to decrypt the encrypted output state.

14. The quantum computing system of claim 13, wherein the computing device is further operable to:
produce the encrypted state from an unencrypted state and an encryption key;
update the encryption key based on the encryption-key-update information; and
decrypt the encrypted output state based on the updated encryption key.

15. The quantum computing system of claim 8, wherein the quantum logic are operable to apply a universal set of quantum gates to the encrypted state, independent of an encryption key used to produce the encrypted state from an unencrypted state.

16. A quantum computing method comprising:
receiving an encrypted state from a correspondent;
receiving a control message from the correspondent;
storing the encrypted state in a quantum register;
applying a quantum circuit to the encrypted state to produce an encrypted output state, the quantum circuit comprising a sequence of operations that manipulates the quantum register and uses an auxiliary quantum state selected from four specified states, and the sequence of operations includes:
an operation parameterized by a control message from the correspondent; and

30 an operation that produces encryption-key-update information
wherein the auxiliary quantum state includes an auxiliary qubit, the quantum register includes a register qubit, and applying the sequence of operations includes:
applying a first gate to the auxiliary qubit and the register qubit;
after applying the first gate:
measuring the register qubit to obtain the encryption-key-update information; and
applying a second gate to the auxiliary qubit, wherein the second gate is parameterized by the control message;
sending the encrypted output state to the correspondent; and
sending the encryption-key-update information to the correspondent.

17. The method of claim 16, wherein the auxiliary quantum state comprises an auxiliary qubit randomly selected from a set of four specified quantum states, and the set is unitarily equivalent to the set $\{|0\rangle, |1\rangle, |+\rangle, |-\rangle\}$.

18. The method of claim 16, wherein the second gate comprises a unitary operation parameterized by the control message and applied to the auxiliary quantum state.

19. The method of claim 16, wherein the first gate comprises at least one multi-qubit operation applied to the auxiliary quantum state and the register qubit in the quantum register.

20. A quantum computing system comprising:
an interface operable to:
receive an encrypted state and a control message from a computing device; and
send an encrypted output state and encryption-key-update information to the computing device;
a quantum register operable to store the encrypted state; and
quantum logic operable to apply a quantum circuit to the encrypted state to produce the encrypted output state, the quantum circuit comprising a sequence of operations that manipulates the quantum register, wherein the sequence of operations is configured to receive an auxiliary quantum state selected from four specified states, and the sequence of operations includes:
an operation parameterized by a control message from the computing device; and
an operation that produces encryption-key-update information
wherein auxiliary quantum state includes an auxiliary qubit, the quantum register includes a register qubit, and applying the sequence of operations includes:
applying a first gate to the auxiliary qubit and the register qubit;
after applying the first gate:
measuring the register qubit to obtain the encryption-key-update information; and
applying a second gate to the auxiliary qubit, wherein the second gate is parameterized by the control message.

21. The quantum computing system of claim 20, further comprising an auxiliary state preparation system operable to prepare the auxiliary quantum state by randomly selecting one of the four specified states.

22. The quantum computing system of claim 21, wherein the auxiliary state preparation system is operable to randomly select the auxiliary quantum state from a set of states, and the set of states is unitarily equivalent to the set $\{|0\rangle, |1\rangle, |+\rangle, |-\rangle\}$.

23. The quantum computing system of claim 20, further comprising the computing device, wherein the computing device is operable to prepare the auxiliary quantum state.

24. The quantum computing system of claim 20, further comprising the computing device, wherein the computing device is operable to decrypt the encrypted output state based on the encryption-key-update information and an encryption key.

25. The quantum computing system of claim 20, wherein the quantum logic are operable to apply a universal set of quantum gates to the encrypted state, independent of an encryption key used to produce the encrypted state from an unencrypted state.

26. A method comprising:
   receiving an encrypted quantum input state from a correspondent;
   receiving a control message from the correspondent;
   storing the encrypted quantum input state in a quantum register that includes a register qubit;
   performing, by a quantum information processing apparatus, a quantum computation that generates an encrypted quantum output state from the encrypted quantum input state, wherein the quantum computation uses an auxiliary quantum state as input, the auxiliary quantum state includes an auxiliary qubit, and performing the quantum computation includes:
      applying a first gate to the auxiliary qubit and the register qubit;
      after applying the first gate:
         measuring the register qubit to obtain encryption-key-update information; and
         applying a second gate to the auxiliary qubit, wherein the second gate is parameterized by the control message;
   generating an encryption-key-update message based on the computation, wherein the encryption-key-update message includes the encryption-key-update information;
   sending the encrypted output state to the correspondent; and
   sending the encryption-key-update message to the correspondent.

27. The method of claim 26, wherein the encryption-key-update message includes information that, when combined with an encryption key, enables decryption of the encrypted quantum output state.

28. The method of claim 27, further comprising sending the encrypted quantum output state and the encryption-key-update message to a holder of the encryption key.

29. The method of claim 28, wherein the quantum information processing apparatus performs the quantum computation without access to the encryption key.

30. The method of claim 1, wherein applying the first gate comprises applying a multi-qubit gate to the auxiliary qubit and the register qubit, and applying the second gate comprises applying a single-qubit rotation to the auxiliary qubit.

31. The quantum computing system of claim 8, wherein the first gate comprises a multi-qubit gate, and the second gate comprises a single-qubit rotation.

32. The method of claim 16, wherein applying the first gate comprises applying a multi-qubit gate to the auxiliary qubit and the register qubit, and applying the second gate comprises applying a single-qubit rotation to the auxiliary qubit.

33. The quantum computing system of claim 20, wherein the first gate comprises a multi-qubit gate, and the second gate comprises a single-qubit rotation.

\* \* \* \* \*

UNITED STATES PATENT AND TRADEMARK OFFICE
CERTIFICATE OF CORRECTION

| | | |
|---|---|---|
| PATENT NO. | : 8,897,449 B1 | Page 1 of 1 |
| APPLICATION NO. | : 13/610096 | |
| DATED | : November 25, 2014 | |
| INVENTOR(S) | : Anne Broadbent | |

It is certified that error appears in the above-identified patent and that said Letters Patent is hereby corrected as shown below:

Title Page, Item (56)

Page 2, Column 1 (Other Publications), Line 3, Delete "Eistenin" and insert -- Einstein --, therefor.

Page 2, Column 1 (Other Publications), Line 12, After "blind" delete "ind".

In the Claims

Column 29, Line 4, In Claim 8, delete "information" and insert -- information; --, therefor.

Column 30, Lines 1-2, In Claim 16, delete "information" and insert -- information; --, therefor.

Column 30, Lines 46-47, In Claim 20, delete "information" and insert -- information; --, therefor.

Column 30, Line 48, In Claim 20, after "wherein" insert -- the --.

Signed and Sealed this
Twenty-first Day of April, 2015

Michelle K. Lee
*Director of the United States Patent and Trademark Office*